US00RE43163E

(19) United States
(12) Reissued Patent
Andrews et al.

(10) Patent Number: US RE43,163 E
(45) Date of Reissued Patent: Feb. 7, 2012

(54) HIGH-SPEED NETWORK OF INDEPENDENTLY LINKED NODES

(75) Inventors: Jock Andrews, Springville, UT (US); Craig A. Miller, Lehi, UT (US); Keith R. Anderson, Springville, UT (US); Richard H. Christensen, Hurricane, UT (US); Marcio Pugina, Orem, UT (US); Jason S. Veech, Oakley, IL (US); Kevin J. Peppin, American Fork, UT (US); Larry G. Erdman, Lehi, UT (US)

(73) Assignee: Brookline Flolmstead LLC, Las Vegas, NV (US)

(21) Appl. No.: 11/318,396

(22) Filed: Dec. 22, 2005
(Under 37 CFR 1.47)

Related U.S. Patent Documents

Reissue of:
(64) Patent No.: 6,667,967
Issued: Dec. 23, 2003
Appl. No.: 09/500,887
Filed: Feb. 9, 2000

U.S. Applications:
(60) Provisional application No. 60/134,294, filed on May 14, 1999.

(51) Int. Cl.
*H04L 12/28* (2006.01)

(52) U.S. Cl. ..... 370/351; 379/342; 710/316; 370/401

(58) Field of Classification Search ..... 370/254, 370/396, 401, 351; 700/286
See application file for complete search history.

(56) References Cited

U.S. PATENT DOCUMENTS
3,750,281 A 8/1973 Belling
(Continued)

FOREIGN PATENT DOCUMENTS
EP 1009156 6/2000
(Continued)

OTHER PUBLICATIONS
Anderson, et al.; U.S. Appl. No. 09/500,721, filed Feb. 9, 2000; Entitled: Large-Scale, High Speed Computer Network and Method of Implementation and Operation.
(Continued)

*Primary Examiner* — Dang Ton
*Assistant Examiner* — Lionel Preval

(57) ABSTRACT

A method of operating a network is beneficially conducted on a municipality or neighborhood level. The method in disclosed embodiments comprises installing a digital communications network within a limited selected geographical region. The network is formed from a high speed backbone and a plurality of nodes branching outward from the high speed backbone. A plurality of communicating stations are connected to the network and users at each communicating station subscribe to communicate over the network. Due to the unique scope of the network, the users are related primarily by virtue of their residence in a common geographical region. The network may be installed within a public utility right of way and may be used to monitor utility usage and to bill utility users. The network is thus independent of public telephone infrastructure. The network is preferably partitioned and communications are direct from station to station without broadcasting. Outside access, such as to the Internet is provided through gateways within the backbone.

22 Claims, 15 Drawing Sheets

U.S. PATENT DOCUMENTS 3,860,748 A 1/1975 Everhart et al.
3,987,240 A 10/1976 Schultz
4,255,609 A 3/1981 Charlebois et al.
4,271,514 A 6/1981 Parras et al.
4,468,571 A 8/1984 Heavey et al.
4,766,536 A 8/1988 Wilson, Jr. et al.
4,800,236 A 1/1989 Lemke
4,834,673 A 5/1989 Beinhaur et al.
4,839,531 A 6/1989 Stemmons et al.
4,897,841 A 1/1990 Gang
4,947,389 A 8/1990 Eng et al.
5,033,112 A 7/1991 Bowling et al.
5,081,621 A 1/1992 Sugimoto
5,145,402 A 9/1992 Plyler et al.
5,148,144 A 9/1992 Sutterlin et al.
5,191,579 A * 3/1993 Matsushita et al. ..... 370/224
5,202,780 A 4/1993 Fussanger
5,218,676 A 6/1993 Ben-Ayed et al.
5,309,437 A 5/1994 Perlman et al.
5,369,518 A 11/1994 Aslami et al.
5,372,840 A 12/1994 Kleyer et al.
5,394,402 A * 2/1995 Ross ..... 370/402
5,420,858 A 5/1995 Marshall et al.
5,426,739 A 6/1995 Lin et al.
5,428,806 A 6/1995 Pocrass
5,444,702 A * 8/1995 Burnett et al. ..... 370/254
5,450,399 A 9/1995 Sugita
5,461,195 A 10/1995 Freeman et al.
5,477,091 A 12/1995 Fiorina et al.
5,487,061 A 1/1996 Bray
5,497,371 A 3/1996 Ellis et al.
5,530,203 A 6/1996 Adams et al.
5,530,860 A 6/1996 Matsuura
5,559,377 A 9/1996 Abraham
5,572,517 A 11/1996 Safadi
5,600,644 A 2/1997 Chang et al.
5,608,446 A 3/1997 Carr et al.
5,654,985 A 8/1997 Crayford et al.
5,677,974 A 10/1997 Elms et al.
5,699,276 A 12/1997 Roos
5,701,120 A 12/1997 Perelman et al.
5,726,851 A 3/1998 Knapp
5,754,451 A 5/1998 Williams
5,815,662 A 9/1998 Ong
5,847,751 A 12/1998 Safadi
5,857,075 A 1/1999 Chung
5,867,484 A 2/1999 Shaunfield
5,892,912 A * 4/1999 Suzuki et al. ..... 370/395.53
5,896,382 A 4/1999 Davis et al.
5,896,385 A 4/1999 Achilleoudis
5,898,387 A 4/1999 Davis et al.
5,898,674 A 4/1999 Mawhinney et al.
5,898,687 A 4/1999 Harriman et al.
5,910,954 A 6/1999 Bronstein et al.
5,920,802 A 7/1999 Bellows et al.
5,925,097 A 7/1999 Gopinath et al.
5,926,101 A 7/1999 Dasgupta
5,937,428 A 8/1999 Jantz
5,950,111 A 9/1999 Georger et al.
5,960,411 A 9/1999 Hartman et al.
5,963,556 A 10/1999 Varghese et al.
5,966,667 A 10/1999 Halloran et al.
5,973,683 A 10/1999 Cragun et al.
5,978,373 A 11/1999 Hoff et al.
5,982,767 A 11/1999 McIntosh
5,982,854 A 11/1999 Ehreth
5,994,998 A 11/1999 Fisher et al.
6,003,079 A 12/1999 Friedrich et al.
6,005,598 A 12/1999 Jeong
6,007,372 A 12/1999 Wood
6,009,097 A 12/1999 Han
6,016,307 A 1/2000 Kaplan et al.
6,023,467 A 2/2000 Abdelhamid et al.
6,023,563 A 2/2000 Shani
6,023,734 A 2/2000 Ratcliff et al.
6,058,367 A 5/2000 Sutcliffe et al.
6,079,020 A 6/2000 Liu
6,085,249 A 7/2000 Wang et al.
6,104,711 A 8/2000 Voit
6,104,727 A 8/2000 Moura et al.
6,109,971 A 8/2000 Vadlakonda
6,112,251 A 8/2000 Rijhsinghani
6,122,740 A 9/2000 Anderson
6,130,879 A 10/2000 Liu
6,140,911 A 10/2000 Fisher et al.
6,144,399 A 11/2000 Manchester et al.
6,144,668 A 11/2000 Bass et al.
6,151,629 A 11/2000 Trewitt
6,169,741 B1 1/2001 LeMaire et al.
6,174,182 B1 1/2001 Kuo
6,175,569 B1 1/2001 Ellington et al.
6,182,846 B1 2/2001 Leschinger et al.
6,192,051 B1 2/2001 Lipman et al.
6,215,785 B1 4/2001 Batruni et al.
6,230,203 B1 5/2001 Koperda et al.
6,233,613 B1 5/2001 Walker et al.
6,236,654 B1 5/2001 Egbert
6,243,749 B1 6/2001 Sitaraman et al.
6,249,528 B1 6/2001 Kothary
6,259,691 B1 7/2001 Naudus
6,263,368 B1 7/2001 Martin
6,276,502 B1 8/2001 Leyba et al.
6,321,245 B1 11/2001 Cukier et al.
6,331,983 B1 12/2001 Haggerty et al.
6,338,053 B2 1/2002 Uehara et al.
6,345,051 B1 2/2002 Gupta et al.
6,359,881 B1 3/2002 Gerszberg et al.
6,374,229 B1 4/2002 Lowrey et al.
6,388,782 B1 5/2002 Stephens et al.
6,399,883 B1 6/2002 Lhota
6,401,119 B1 6/2002 Fuss et al.
6,418,125 B1 7/2002 Oran
6,420,963 B1 7/2002 Rossetti et al.
6,421,675 B1 7/2002 Ryan et al.
6,448,500 B1 9/2002 Hosaka et al.
6,466,986 B1 10/2002 Sawyer et al.
6,480,488 B1 11/2002 Huang
6,526,479 B2 2/2003 Rosenzweig
6,529,691 B2 3/2003 Guy et al.
6,535,983 B1 3/2003 McCormack et al.
6,538,577 B1 3/2003 Ehrke et al.
6,542,964 B1 4/2003 Scharber
6,553,031 B1 4/2003 Nakamura et al.
6,556,574 B1 4/2003 Pearce et al.
6,570,880 B1 5/2003 Coden
6,580,715 B1 6/2003 Bare
6,603,769 B1 8/2003 Thubert et al.
6,633,567 B1 10/2003 Brown
6,643,566 B1 * 11/2003 Lehr et al. ..... 700/286
6,667,967 B1 12/2003 Anderson et al.
6,674,971 B1 1/2004 Boggess et al.
6,768,738 B1 7/2004 Yazaki et al.
6,813,279 B1 11/2004 Trainin
6,822,955 B1 11/2004 Brothers et al.
6,829,651 B1 12/2004 Bass et al.
6,917,614 B1 7/2005 Laubach et al.
6,931,003 B2 8/2005 Anderson
6,931,183 B2 8/2005 Panak et al.
6,954,859 B1 10/2005 Simerly et al.
7,000,026 B2 2/2006 Beshai et al.
7,016,365 B1 3/2006 Grow et al.
7,054,376 B1 5/2006 Rubinstain et al.
7,072,407 B2 7/2006 Schurig
7,200,152 B2 4/2007 Binder
7,257,118 B2 8/2007 Chase et al.
7,392,223 B1 6/2008 Ganesan et al.
7,577,857 B1 8/2009 Henderson et al.
2002/0013858 A1 1/2002 Anderson
2002/0033416 A1 3/2002 Gerszberg et al.
2002/0176403 A1 11/2002 Radian
2005/0083784 A1 4/2005 Iseli et al.
2005/0232278 A1 10/2005 Anderson
2005/0249116 A1 11/2005 Anderson
2007/0121634 A1 5/2007 Anderson et al.

FOREIGN PATENT DOCUMENTS

WO 0070808 11/2000

OTHER PUBLICATIONS

Anderson, et al.; U.S. Appl. No. 09/500,724, filed Feb. 9, 2000; Entitled: Broadcast-Inhibited, Neighborhood-Area Network.
Anderson, et al.; U.S. Appl. No. 09/500,886, filed Feb. 9, 2000; Entitled: Point-To-Point, Non-Broadcast-Messaging Network and Method of Implementation and Operation.
Anderson, et al.; U.S. Appl. No. 09/500,884, filed Feb. 9, 2000; Entitled: Packet-Trapping, Neighborhood-Area Network.
Anderson, et al.; U.S. Appl. No. 09/501,091, filed Feb. 9, 2000; Entitled: Bridge-Router, Local-Packet-Transfer Network.
Carl-Mitchel et al. "Using ARP to Implement Transparent Subnet Gateways" Texas Internet Consulting, Oct. 1987.
J. Postal "Multi-LAN Address Resolution" ISI Oct. 1984.
Search Report for PCT/US00/11033 issued Nov. 16, 2000.
Written Opinion for PCT/US00/11033 issued Jun. 20, 2001.
International Preliminary Examination Report for PCT/US00/11033 issued on Sep. 30, 2001.
Official Action in U.S. Appl. No. 11/514,294 dated Feb. 2, 2009, 23 pages.
Response to Official Action in U.S. Appl. No. 11/514,294 dated Feb. 9, 2009 mailed Jun. 9, 2009, 13 pages.
Official Action in U.S. Appl. No. 11/514,294 dated Oct. 16, 2009, 26 pages.
Response to Official Action in U.S. Appl. No. 11/514,294 dated Oct. 16, 2009 mailed Jan. 14, 2010, 15 pages.
Official Action in U.S. Appl. No. 11/514,294 dated Mar. 31, 2010, 28 pages.
"Metropolitan Area Networks," Matthew N. 0. Sadiku, 1994, CRC Press Inc., pp. 1-3, 5, 8-10, 12, 13, 15-17, 19, 20.

* cited by examiner

HIGH-SPEED NETWORK OF INDEPENDENTLY LINKED NODES

Matter enclosed in heavy brackets [ ] appears in the original patent but forms no part of this reissue specification; matter printed in italics indicates the additions made by reissue.

RELATED APPLICATIONS

This application is a Continuation-In-Part of and claims priority to U.S. Provisional Patent Application Ser. No. 60/134,294, filed on May 14, 1999 and entitled Neighborhood Area Network.

BACKGROUND OF THE INVENTION

1. The Field of the Invention

The present invention relates to computer communications networks. More specifically, the present invention relates to computer high-speed networks linking geographically related users and to manners of implementing and operating such networks.

2. The Relevant Technology

Computer technology is breaking barriers to interpersonal communications at an amazing rate. Already, it is possible to communicate almost instantaneously with anyone in the world that has a computer and a telephone line. Computer networks, such as the Internet, link individuals and various types of organizations in world-wide digital communication. The Internet has almost unlimited promise for communications advances, but is limited by an overburdened and somewhat unsuited transmission medium.

In addition to the Internet, businesses, educational institutions, government agencies, and other similarly related entities also communicate over much smaller-scale networks, such as local area networks (LANs) and wide area networks (WANs). These small-scale networks, particularly LANS, operate at much higher speeds than the Internet, but are expensive to operate at large scales. Thus, a large gap exists, between the scope of coverage and speed of operation of the global, but relatively slow, Internet and the faster but more limited LANs and WANs. It would be advantageous to close this gap with larger-scale networks that operate at speeds close to that of LANS.

Several barriers exist to filling the gap between current limited coverage networks and the Internet. One such barrier is the "last mile" dilemma. That is, the Internet runs at very high speeds over its backbone, but slows down considerably over its localized connections. Generally, the Internet relies upon standard telecommunications industry lines and switching equipment for this last mile. This infrastructure is designed for telephone communications, and is not well adapted to the packetized communications of digital networks. A dilemma lies, however, in replacing the telephone infrastructure with transmission mediums more suited to digital communications. It is currently considered prohibitively expensive to connect high speed communications lines down to the individual users of the Internet.

This fact, together with the general congestion of the Internet in general leads to a substantial slow down of Internet communications. It also limits the deployment of intermediate types of networks. A further barrier to the implementation of networks of varying scopes and to the new introduction of new paradigms for network communication comes in the form of financing. Such developments using current technology would be prohibitively expensive. Who is going to pay for this infrastructure?

Accordingly, a need exists for an intermediate sized network to close the gap between the world-wide Internet and current relatively small scale networks. Preferably, such an intermediate sized network operates at speeds similar to those of LANS, coverage both in geographical area and diversify of user type. Additionally any solution to this problem should also address financing of installation and should overcome the last mile dilemma. New technologies for achieving such a new paradigm in computer networking are similarly needed.

BRIEF SUMMARY OF THE INVENTION

In order to overcome many or all of the above-discussed problems, the present invention comprises methods, apparatus, and systems for implementing Large-scale high speed computer network. The network may connect an entire neighborhood or city in networked communications, and accordingly, will be referred to herein as a Neighborhood Area Network (NAN). The NAN of the present invention is a network conducted on a unique scale with a unique clientele and is implemented in a manner that transcends traditional network boundaries and protocols. The NAN is not equivalent to a wide area network WAN, in part because it is essentially routerless. That is, while a plurality of NAN, may be interconnected through the use of routers, each individual NAN is preferably constructed without the use of internal routers. The NAN is unique from local area networks (LANs) as well. One reason is that, due to its many novel features, it can be of a size and scope previously unobtainable by conventional LANs.

The NAN is further unique because it is intended to cover and serve a selected geographical area and to blanket that geographical area, rather than functioning to serve a specific government, business, educational, or similarly related entity. Accordingly, the subscribers and users of the NAN may be substantially non-related in any traditional business manner. Furthermore, funding for the NAN, rather than being provided by a business-type entity or subsidized by a governmental organization, may be funded at least in part by an independent third party, such as a utility company and may be funded in total or in part by subscribers.

The NAN is also comparatively inexpensive to install, making the placement of a NAN in every neighborhood a real possibility. The NAN of the present invention is capable of eliminating the message traffic burden from the Internet, thereby speeding up the Internet, as it is adapted to be operated completely independent of the currently highly burdened telecommunications infrastructure (although Internet service may be provided over the NAN).

In one embodiment, the NAN is comprised of an optic fiber ring serving as the outer backbone of the NAN. The ring is preferably populated with one or more fiber boxes, each containing circuitry including switches, repeaters, gateways, etc. The fiber boxes in one embodiment connect the backbone to a central office or headquarters data center in which a server is preferably located. One or more gateways are preferably provided within the backbone for access by Internet Service Providers (ISPs). An inner backbone comprised of scalable 10 to 100 megabit coaxial cable preferably branches from the fiber backbone.

The coaxial cable preferably originates at the fiber boxes and branches through the selected geographical region (discussed herein as a neighborhood, but of course, any geographical scale could be served), connected by repeaters and nodes to individual communicating stations. The inner backbone is preferably partitioned for efficient routing of traffic.

The nodes in one embodiment comprise hubs. The repeaters may be placed three hundred feet apart along the coaxial cable, with hubs placed within thirty feet of every house, business, or other type of communicating station on the NAN. The hubs preferably connect to the local houses or other buildings with ten-base-T twisted pair copper wiring employing the Category 5 (Cat5) standard. The hubs in one embodiment are powered by one or more of the communicating stations that they service. Accordingly, each station connected to a hub may share the powering of the hub and may share the powering of other switching equipment of the NAN as well.

In one embodiment NAN software operates on the server, the fiber boxes, the repeaters, and the hubs. Client software preferably operates a computers located at each communicating station. Additional functional software or logic may also execute on communicating stations or computers of subscribing service providers. For example, software may communicate with an electric power meter for transmitting information regarding power consumption from a communicating station (the power customer) through the network to third party service provider, in this case, a utility power company.

In one embodiment, at least a portion of the backbone is installed over the right-of-way owned by or franchised to a public utility such as gas, electric, or power company. This negates any need for a separate utility administering the NAN to acquire a new easement or franchise from the landowners or the government entity of the geographic region. The NAN may be financed and/or installed through the cooperation of the utility service provider company. This arrangement allows the public utility service provider that would otherwise be unable to enter the digital communication market to participate. It is also advantageous in that a NAN developer or administration entity would otherwise likely be unable to afford to finance and install the NAN due to the cost and risk of funding and lack of sufficient rights-of-way.

In certain embodiments of an apparatus and method in accordance with the present invention, an independent entity may create a city-wide network or NAN. The network includes, in one embodiment, a fiber optic ring within the city to serve as a local backbone. The fiber optic ring may be fully redundant. That is, it preferably completes a loop such that any break in the loop will not shut the whole system down. The fiber can be laid inexpensively as distances are not great and thus, less expensive local short-distance-types of fiber cable can be used. A low cost fiber can be used, such as feeder fiber which is less costly, and which requires less labor to install.

The fiber backbone is preferably populated by fiber boxes having switches therein. Coaxial cable from switches to bridges and repeaters to hubs. The hubs may connect to client stations using twisted-pair, copper cabling. A central server may be used and may be located within a headquarters data center. A headquarters data center may be employed as a gateway for Internet service providers. In addition, the Internet service providers may enter the system through other gateways including one or more switches.

The fiber backbone may be laid using the franchise agreement granted to the power company within a city or region. Thus, as the entire network is laid independently, the ISP service is provided independent of the telecommunications line over the entire route. Additionally, all ISPs are available on the net allowing equal access without choking traffic.

The infrastructure is preferably upgradable from 10 megabit to gigabit technology over the same lines, such that the lines need not be relaid in order to upgrade. Services that can be provided include surveillance, on-line books, two-way multi camera, schools, etc. Additionally, IPBX, telephone, television, CATV, and video on demand can be provided over the NAN. Video can be provided allowing independent selection, broadcast, start time and may be buffered to the user in real time.

The NAN also preferably incorporates one or more multi-port switches which are configured to truncate broadcast data. The multi-port switch is preferably an indoor switch but is contained in an aluminum pedestal of dimensions approximately 3 by 2 by 2 feet and is environmentally controlled.

The repeaters in preferred embodiments convert the data from the switches to be transmitted over coaxial cable and are preferably semi-intelligent. In one embodiment, the repeaters are housed out of doors within a protective pedestal. The pedestal may be located on the ground or hung from power lines.

The bridges are, in preferred embodiments, high speed with a look-up binary tree and are preferably contained in the protective pedestals. The bridges also filter out broadcast traffic. The hubs route traffic to subscribing communicating stations and convert from coaxial to twisted pair cable. The hubs are connected with a T-connector and powered by the cooperative power coupler of the present invention.

The P-coupler preferably includes a series of transformers, one at each communicating station. The communicating station connect with Cat5 wiring to the hub through a home connection box. The home connection box preferably provides convenient connections for power to the hub and for transmit and receive lines. The lines at the home connection box are wired alphabetically. The home connection box connects preferably connects with Ethernet cabling to a network card located within a computer at the client station.

A modular power connector is preferably located at the home connection box. The wiring from the communicating station to the hub operates, in one embodiment, at ten megabytes per second. Three pairs of lines are preferably used, a transmit twisted pair, a receive twisted pair, and an A/C twisted pair running from the transformer to power the hub.

The NAN of the present invention is a high speed routerless network which differs from traditional large scale networks in that traffic is routed locally and that it has the speed of a small local area network but with many more stations connected thereto. The large amount of communicating stations is facilitated by the many novel aspects of the invention.

The NAN can be described as a baseband network rather than a broadband network because it addresses communicating stations directly and linearly rather than through broadcasting of data. The NAN of the present invention defines what cannot be routed rather than defining the types of packets that can be routed. The NAN also preferably uses converse/inverse filtering. Because the communications traffic is direct-routed, neighbor to neighbor communications is very high speed and occupies only a small part of the NAN. It also reduces the burden on the Internet.

METHOD OF IMPLEMENTATION

The NAN of the present invention is unique in that its clients are merely geographically related, rather than being business, government, educational institution, or otherwise related. Additionally, individual subscribers pay for the continued operation of the NAN rather than a single large entity. The NAN may be partially funded by public service companies such as utility companies. In one embodiment, the power company pays a portion of the installation fees in return for receiving a portion of the subscription and allows the infrastructure to be installed along its rights of way for which it has a business franchise. Accordingly, the NAN need not have a separate franchise and need not be a public utility.

Additionally, the power company or other public utility may receive benefits in the form of cheaper monitoring of the usage of its services. For instance, power companies may be able to automatically read the meters of the subscribers through the NAN, rather than having to send out meter readers, thereby reducing the cost. Billing and payment may also be automated over the NAN, further reducing costs.

The NAN may be administered by a private company, but is preferably not controlled by any central agency, governmental body or other entity, and thus, is a true community network.

Subscribers are allowed to join for an initial hook-up fee and a monthly service fee, similar to cable or telephone service. Upon paying the hook-up fee, customers are connected and provided with access to the NAN, but if they do not pay the monthly fee, some or all their services may be cut off.

The subscribers are all provided with an IP address upon the first use of their account. The IP address is in one embodiment semi-permanent in that it is retained until the subscriber changes network cards or computers. The IP addresses are retained in a binding within a server located at the central office. The server sends out the IP addresses, and the IP addresses are retained within bridges and within the switches in order to route the traffic accordingly.

The subscribers are preferably provided with Internet service from outside ISP which connect to the backbone through gateways. Internet service fees may be part of the subscription or may be part of independent subscription fees.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
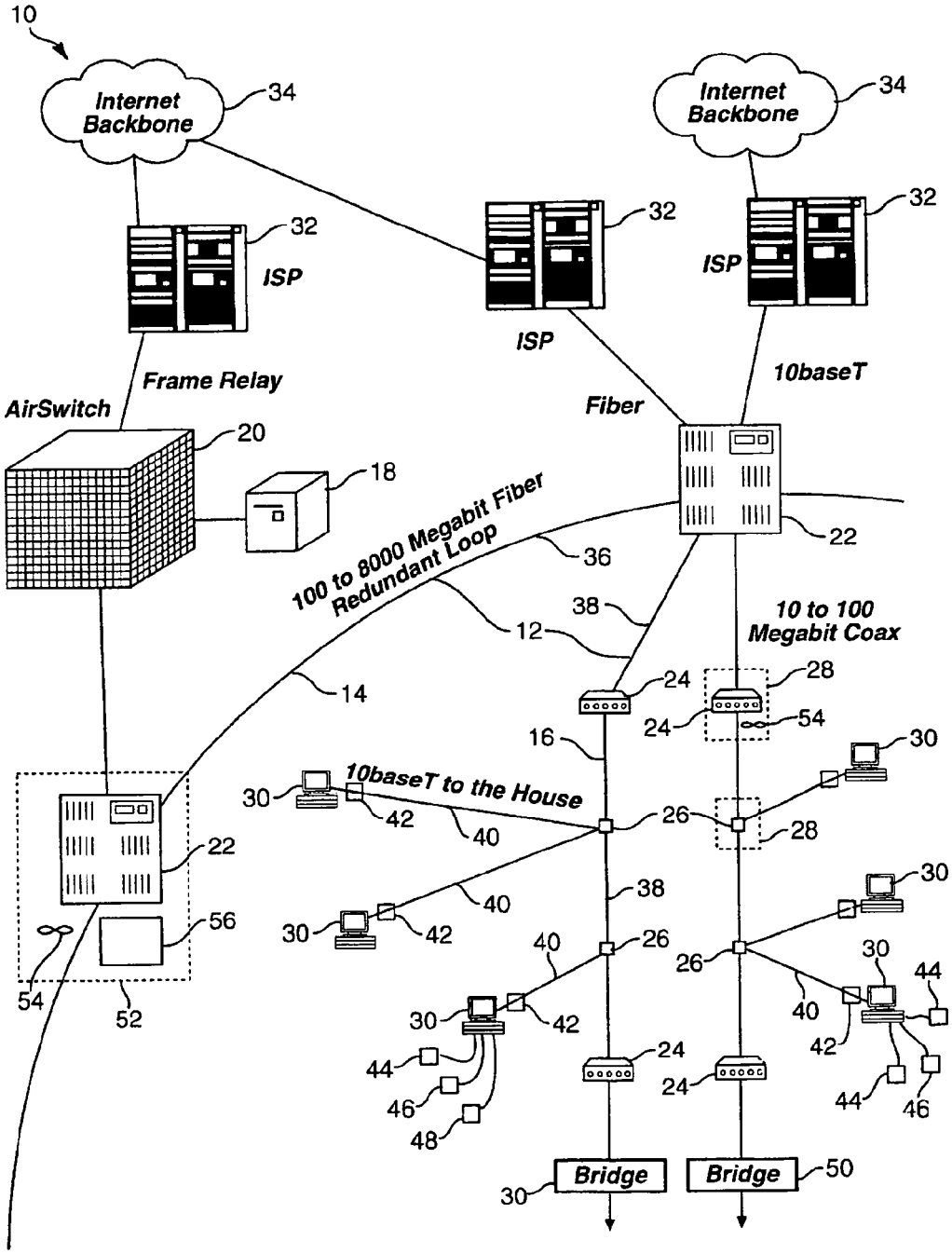
FIG. 1 is a schematic block diagram illustrating one embodiment of network system hardware for use with the present invention.

Referring now to FIG. 1, shown therein is a schematic block diagram showing various hardware components of one embodiment of a large-scale, high speed network of the present invention. Because the network is intended to serve a selected geographical region, it is referred to herein as a neighborhood area network (ANA) 10. The NAN 10, as depicted, includes a backbone 12, that is divided into two components. A first component is a fiber backbone 14 that is preferably adapted to transmit packetized data using standard optical communications protocols and technology. The fiber backbone 14 is preferably configured in a ring with incoming traffic traveling in a selected given direction.

Figure 3:
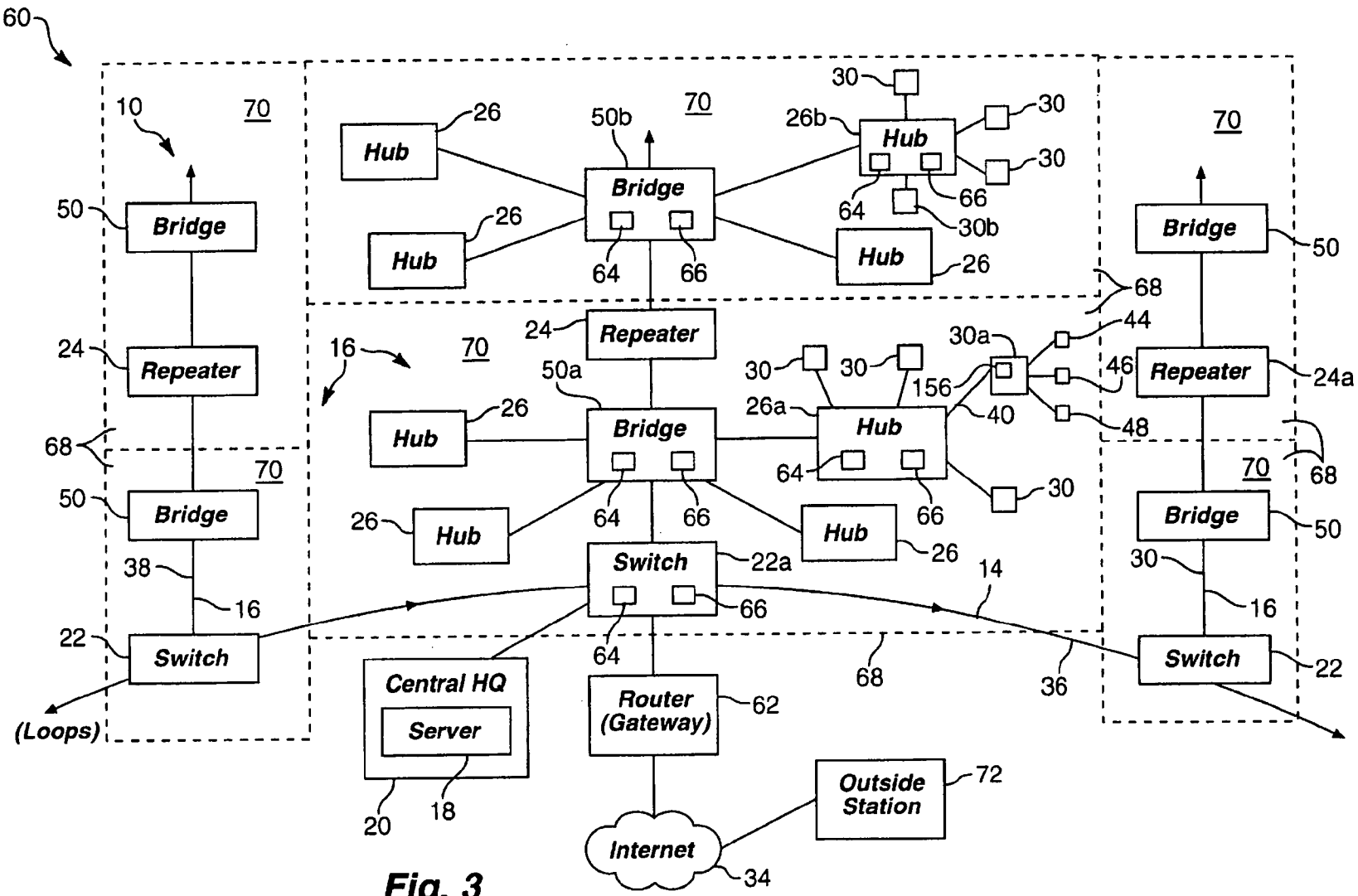
FIG. 3 is a schematic block diagram of one embodiment of a network architecture for use with the present invention.

A second component comprises a local backbone 16 that is preferably configured with a non-redundant branching structure and that is adapted to transmit data using radio wave signals. In the schematic depiction of FIG. 1, the physical locations of connections are represented, while an example of the actual branching structure is shown in FIG. 3.

The NAN system 10 in the depicted embodiment of FIG. 1 also includes a server 18 which may be located at a central headquarters office 20. One or more fiber switches 22 may be located within the fiber backbone 14. Indeed, the fiber backbone 14 may complete a circle around a neighborhood or other common geographical region which is intended to be networked in computer, voice, and or/video communication. The fiber backbone 14 may be provided with redundant loops in case one loop becomes inoperable.

The local backbone 16 preferably communicates with the fiber backbone 14 through one or more fiber switches 22. Each fiber switch 22 is preferably configured to examine packetized message traffic passing therethrough, and where a message is intended for a communicating station serviced by a portion of the local backbone serviced by the switch 22, route the message onto the local backbone 16. Each switch 22 also preferably routes locally generated traffic with external destinations to the fiber backbone 14 for receipt by other switches or gateways 108 to the Internet 34. The switches 22 preferably also convert communications between optical communications signals and radio frequency signals.

Within the local backbone 16, switching devices, including a series of repeaters 24, nodes 26, and bridges 50 are preferably deployed. In one embodiment, the local backbone 16 is provided with coaxial cable 38 having a sufficiently high band width and having signals of sufficiently high amplitude that repeaters 24 are needed only every 300 feet or so. The nodes may comprise hubs 26 which, due to the efficient propagation of the NAN 10, can be located up to 30 feet from each communicating station 30.

Communicating stations 30 in one embodiment connected to the nodes 26, with Cat 5, twisted pair wiring 40 through a home connection box 42. Internet Service Providers (ISPs) 32 are shown connected to the NAN 10 through in several different types of gateways. An ISP 32 may connect through the central headquarters office 20 and from there to a fiber switch 22. Alternatively, an ISP may communicate directly with the fiber backbone 14 through a fiber switch 22. The ISPs provide access to the worldwide web and the Internet 34.

Each communicating station 30 may be provided with one or more home service boxes 44. The service boxes 44 communicate over the NAN 10 and provide interactivity from a remote distance. The service boxes 44 may comprise, for instance, power meters 46, security systems 48, and any number of electrical and mechanized devices, including appliances, sprinkling systems, synchronized clocks, etc.

The fiber switches 22 may be housed within containment units 52. The containment units 52 may be located inside or out of doors and are preferably provided with insulation and/or environmental control devices such as a fan 54 and/or air conditioning 56. The containment units 52 are preferably vented.

The repeaters 24, bridges 50 and nodes 26 are preferably located within protective pedestals 28 which are also preferably vented, which provide a hardened outer shell, and which may be provided with fans 54 or other environmental control devices. The pedestals 28 may be mounted in the ground, or may be mounted from utility and/or power lines overhead. The pedestals 28 preferably provide some type of lightening protection such as a Faraday shield. The pedestals 28 are described in greater detail below with reference to FIGS. 7 and 8.

Figure 2:
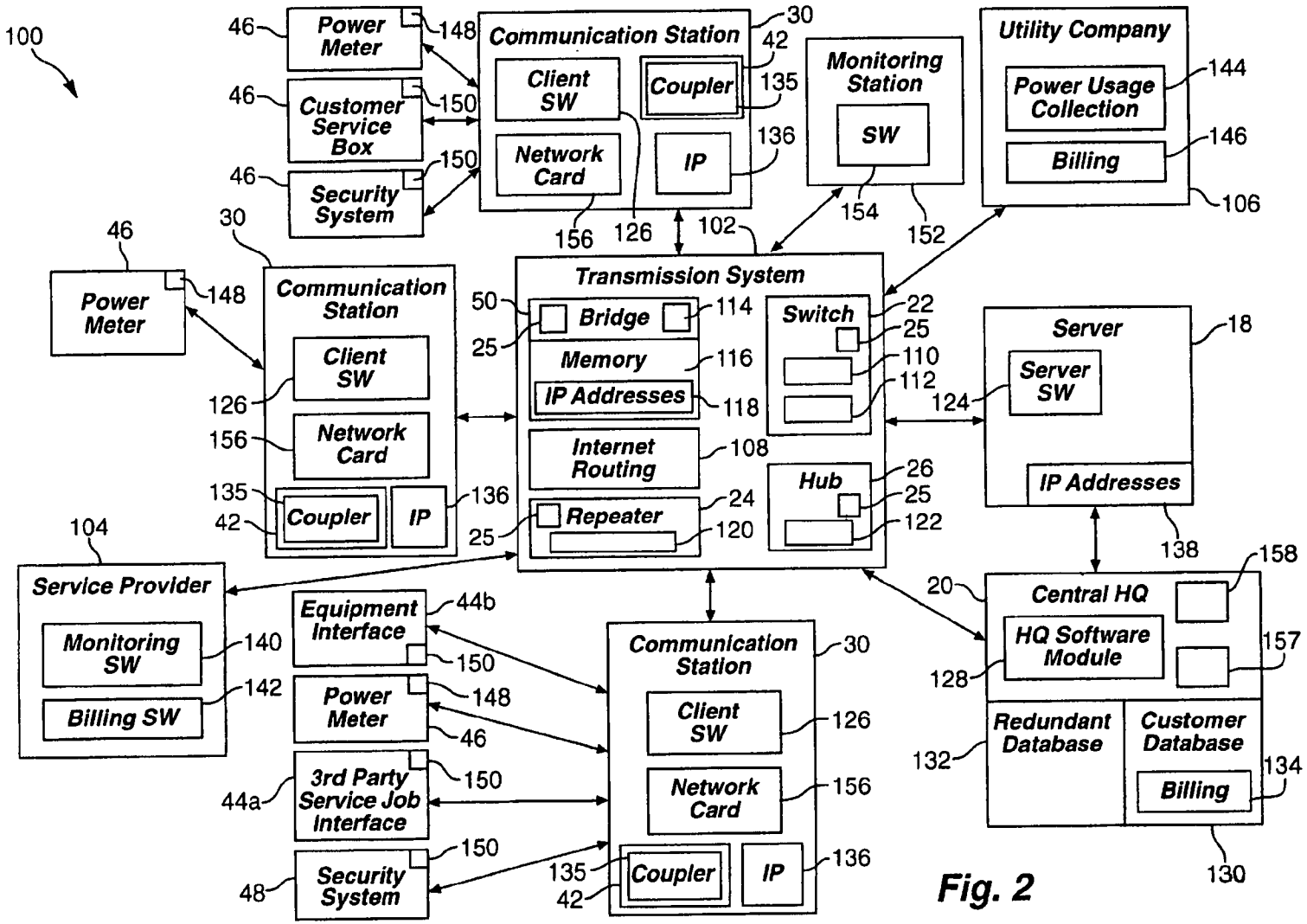
FIG. 2 is a schematic block diagram illustrating one embodiment of a system architecture for use with the present invention.

FIG. 2 is a functional block diagram illustrating a system architecture 100 including operative data structures and executable modules for controlling the operation of the hardware of the NAN 10 depicted in FIG. 1. The system architecture 100 controls the interactions of the various intelligent components of the NAN 10 of FIG. 1.

Accordingly, shown in FIG. 2 are the different modules and executables for operating the NAN 10. Included are a plurality of client stations 30 communicating over a transmission system 102. Other entities may also communicate over the transmission system 102. These include the central headquarters office 20, the server 18, a monitoring station 152, and service providers 104, including a utility company 106.

Referring now to the transmission system 102, one method of operation of the NAN 10 to transmit information between the client stations 30 will be described. In one embodiment, the NAN backbone 12 is essentially routerless. That is, the system is operated at a large scale, but using the same principles as a small local area network. This is achievable due to the unique architecture and configuration of the NAN 10. Routers (62 in FIG. 3) are required only when connecting to outside entities, such as other NANs or the Internet 34.

Components included within the system 100 include the bridges 50, the switches 22, the repeaters 24, and the nodes, which in one embodiment comprise hubs 26. Also included within the system 102 is an Internet routing module 108 which routes traffic to and from the ISP's 32. The Internet routing module 108 operates as a gateway and may comprise a switch 22 and a router 62.

The switches 22 are provided with software modules in the form of a switch routing module 110 and a switch conversion module 112. The switch routing module 110 is used to route traffic between the switches 22. The switch conversion module 112 is used to convert packeted traffic between the optical communications protocol and the radio frequency signals used within the coaxial cable lines 16. Thus, in preferred embodiments, each switch includes one or more protocol converters interfacing between fiber cabling and Cat5 twisted pair wiring.

The protocol converters translate the optical signals into radio frequency signals for transmission on the coaxial Cat5 cables. The radio frequency signals are in turn translated into digital signals by the network cards 156.

The Cat5 twisted pair wires lead into out of the switch 22 and connect to the protocol converters 112 and to repeaters 24. The repeaters 24 place the data packets on the coaxial cable 16. The Cat5 wiring may also lead directly to client stations 30 that are within 300 feet of the switch 22.

Traffic is routed in an efficient manner whereby the system 100 utilizes the high speed fiber cables 14 to as great a degree as possible routing packetized traffic to the switch 22 closest to the communicating station 30 to which the message is addressed. Once the packet reaches the closest switch 22, it is routed through a repeater 24 onto the local backbone 12. Once on the local backbone 12, the packet passes to a bridge 50 and then to the node 26 closest to the client station 30 in a manner be discussed below with relation to FIG. 3.

The repeaters 24 are preferably spaced approximately every 300 feet in order to avoid over-attenuation of the signals carrying the data packets. The nodes 26 are placed within 30 feet of each communicating station 30.

The communicating stations 30 are preferably provided with client software 126 for enabling communications over the NAN 10. The NAN 10 communications medium is, in one embodiment, standardized Ethernet data packets adhering to the Ethernet/OSI standards. In one embodiment, the data packets may be transmitted over the NAN 10 using merely MAC addresses of the low levels of the OSI model.

Client stations 30 which are new to the NAN 10 transmit an initial communication packet over the NAN 10 to the server 18. The server 18 in reply issues an IP address 138 to the client station 30 which is semi-permanent. Thereafter, the client station 30 has a semipermanent IP address 136 which is changed only upon incidents such as the computer or network card of the client station 30 being changed.

The packets are routed through the switches 22, repeaters 24, and nodes 26, to the addressed client stations 30. The packets may be transmitted at a rate of 10 megabits per second due to the unique architecture of the NAN 10. This high rate of speed can be upgraded by a factor of 10 or even up to a factor of one hundred without having to redeploy the fiber cables 14, the coaxial cables 16, and the pair twisted wiring 40. This, again, is due to the unique architecture of the system.

The system architecture includes extending the distance a packet can travel up to between 3000 and 25000 feet and increasing the maximum tolerable packet acknowledgment time. This is accomplished in one embodiment by digressing from the IEEE standards.

For instance, the signals with which the packets are transmitted are amplified to a higher power than those on standard networks. This is accomplished by increasing the gain in the amplifiers that make the repeaters function. Additionally, the reception equipment is preferably more sensitive and able to capture a more degraded signal than standard network equipment.

The fact that the system operates on a baseband concept wherein all of the cable bandwidth is restricted to one channel rather than being divided into multiple channels allows for a higher bandwidth and greater power from the repeaters. This allows for collision detection over the cable 38 and for a release of the collision detection at a much lower level. Thus, voltage spikes are detected and ignored so that lower level collisions are not detected and the large level collisions can be detected. The incidences of these collisions are highly reduced due to the high bandwidth and direct routing of the system 100.

Collision detection is preferably accomplished through voltage detection and timed resends and is adjusted to compensate for the increased sensitivity of the repeaters.

The repeaters 24 are provided with software or other logical circuitry 120 therein which allows the repeaters 24 to be semi-intelligent. The repeaters 24 transmit the fact that they are functioning, as well as information regarding the amount of traffic passing therethrough, in order to better manage the NAN 10. Otherwise, the repeaters 24 merely pass the packets through and do not provide any switching function, merely increasing the amplitude of the signals carrying the packets. As mentioned, the repeaters 24 are, in one embodiment, placed every 300 feet across the local backbone 16.

The hubs 26 route the packetized traffic through the Cat5 twisted pair wiring 38 to the communicating stations 30. Internet routing 108 may also take place to route the Internet communications to the ISPs 32. Communications with external stations over the Internet 34 may be conducted with a permanent IP address to get the messages within the NAN 10, wherein the outside data packets are routed using MAC addresses. Additionally, stations 30 without permanent IP addresses may communicate through the use of a masqueraded IP address using a permanent IP address to get into the NAN and the semi-permanent IP addresses 136 issued to each client station 30 in a manner that will be discussed below in greater detail.

The bridges 50 are provided with software 114 and are also provided with a memory 116 containing a bank 118 of the IP addresses 136 of each client station 30. The bank 118 also includes, for each corresponding IP address 136, information regarding the location of the client station 30 to which the IP address 136 is assigned.

Accordingly, the bridges limit communications to only a particular portion of the network 10 to which the communication is addressed. Thus, the bridges 50 effectively partition the NAN 10. A further function of the bridges 50 and the switches 22 is to eliminate unwanted communications. For instance, in one embodiment, broadcast packets and messages are forbidden. Accordingly, each switch 22 and bridge 50 may be provided with a traffic filter module 160 as depicted in FIG. 4.

Figure 4:
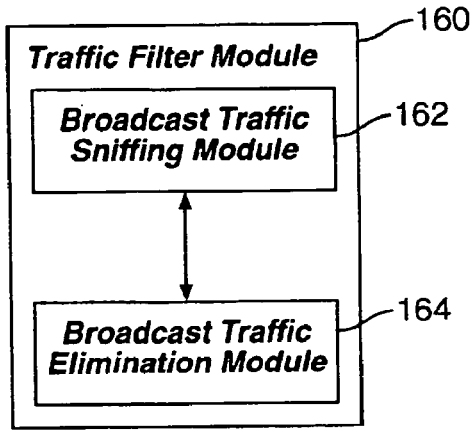
FIG. 4 is a schematic block diagram of one embodiment of a traffic filter module for use with the present invention.

Referring to FIG. 4, the traffic filter module 160 is used to eliminate certain types of traffic that may not be routed over the NAN 10. Accordingly, the NAN 10 is defined as determining what types of communications can not be routed rather than determining what types can be routed, as in the prior art. Within each traffic filter module 160 may be a broadcast traffic sniffing module 162. The broadcast traffic sniffing module 162 examines each information packet 165 (shown in FIG. 4A) and checks certain fields 171 which indicate that the packet 165 is broadcast data. When the traffic sniffing module 162 determines that the packet 165 is broadcast traffic, it then initiates the traffic elimination module 164 which eliminates the broadcast packet 165.

The bridges 50 and switches 22 in one embodiment detect broadcast traffic by detecting an empty field 171 within the MAC address 170. Alternatively, the broadcast traffic sniffing module 162 may detect a series of addresses at a certain level such as 255, 255, 255, 255 to detect a broadcast packet 165.

Thus, because the NAN 10 eliminates unwanted traffic and restricts traffic to only those portions of the NAN 10 through which the packet 165 must travel to reach the addressed communication station 30 in the most efficient manner, much extraneous traffic is eliminated. This, combined with the higher speeds of the present invention, allow the NAN 10 to be operated as if it were a local area network but on much grander scales, indeed, even to include entire neighborhoods or municipalities. Additionally, because of this, the NAN 10 is suitable for use in geographical areas covering extensive distances that are merely geographically or community interest related, rather than being business, government, education or otherwise related. Thus, the NAN system 10 can be by financed at least in part by the service providers which will benefit from the efficient communication of the NAN 10.

Referring now to the service providers 104 of FIG. 2, an example of such a service provider is a utility company 106. In one embodiment, the utility company 106 is a power company. Thus, for example, the power company can communicate over the transmission system 102 on the NAN 10 with each client station 30. Within each client station 30 is one or more service boxes 144 having therein customer service software 150.

The customer service software 150 might, in one instance, comprise power meter software 148 within a power meter box 46. The power meter software 148 may transmit power usage through the NAN 10 back to the utility company 106. The utility company 106, with a power usage collection module 144, receives the power usage data and transmits it to a billing module 146. The billing module 146 then bills the customer at the communicating station 30 over the transmission station 102. The payment of the bill may also pass through the transmission system 102, thus passing through the NAN 10 back to the utility company 106. Of course, utility companies other than the power company may also use this system of data collection billing and payment receipt.

Other types of service boxes 144 may also contain customer service box software 150. For instance, the security system 48 may contain therein software which notifies the monitoring station 152 of any irregularities. Software 154 within the monitoring station 152 may monitor the data transmitted by the security system 48. For instance, this data might include home security system data indicating that a break-in has occurred. The security system 48 may also indicate the occurrence of a fire, and may transmit full video surveillance data back to the monitoring station 152. The monitoring station 152 or a similar station may also monitor the contents of the NAN 10 in order to eliminate illegal traffic. Pornography or other types of traffic may likewise be eliminated.

Each client station 30 as mentioned, preferably communicates at the MAC layer within the NAN 10. The client stations 30 may also be provided with a semi-permanent IP address for communications external to the NAN 10. The server 18 is provided with server software 124 which maintains a bank 138 of the IP addresses 136. The server 18 thus issues the IP addresses 136 and also maintains a binding between the MAC layer communications and the IP addresses 136. These bindings are transmitted to the switches 22, bridges 50, and any other equipment with a need to know the IP addresses 136 of the client stations 30.

Consequently, the server 18 is not necessary other than for issuing IP addresses and maintaining bindings, and indeed, if the server 18 were to go down, the transmission system 102 operating on the NAN 10 could continue to operate. New client stations 30 would merely not be able to receive an IP address.

The central headquarters office 20 preferably contains therein a headquarters software module 128. The headquarters software module 128 may conduct monitoring and billing types of operations. Thus, a customer database 130 may be maintained therein and may coordinate with a billing module 134. A redundant database 132 is also preferably included. The redundant database 132 may be located at a distant site such that it maintains a copy of all data in the case of a failure of the customer data 130. Synchronizing information may pass between the customer database 130 and the redundant database 132 over the NAN 10 with the use of the transmission system 102.

Billing information may be generated and stored within the billing module 134 and may be transmitted to communicating stations 30 over the transmission system 102. The customer database 130 may maintain records including records of which customers are behind on their payments. If the customers are behind, the client station 130 of that customer may be denied services in part or in full of the NAN system 10. These services include, in one embodiment, Internet service.

The communicating stations 30 are preferably provided with standard network cards 156 which transmit through the home connection box 42. The client software 126 residing at the communicating stations 30 preferably maintains the client's IP address 136 and receives and generates data packets (shown at 165 in FIG. 4A) with which information is transmitted over the transmission system 102. The client software 126 may provide many various types of functions, including video phone communication, audio, and video transmission, payment of bills, ordering of on-demand video, transmission of home security information, etc.

A power coupler 135 may be provided within or in communication with the home connection box 42. The power coupler 135 preferably conditions incoming power from a power source at each communicating station, combines the power and network connection, and provides a simple manner of connecting the twisted pair wiring to standard computer cabling, preferably Ethernet cable, which passes to the computer at the communicating station 30. In one embodiment, the twisted pair wiring is provided with a twisted pair for transmission, a twisted pair for reception, and a twisted pair carrying AC to the hub 26, as will be discussed in greater detail below with reference to FIGS. 5 and 6.

The hub 26 is in one embodiment provided with a power concentrator 25 which provides power conditioning and power delivery to the hub 26. The power concentrator receives power from the power coupler 135 of the communicating stations 30. Preferably the power concentrator 25 receives power from two or more stations 30 and passes the power on to the hub 26 or other switching device. A power concentrator 25 receives power through a transformer connected to a wall socket at the communicating station 30. In one preferred embodiment, four houses share a hub and provide power to the hub. The hub bleeds power out of the four transformers at a time, but can receive power from less than all of them and be at a full power level. This redundant power supply scheme ensures that the hub 26 continues operating even if one of the power sources, i.e., one of the communicating station 30, goes down. Thus, AC power is received from the communicating station 30 through the power coupler 135 to the power concentrator 25. In addition, all switching equipment may be powered cooperatively in this manner and may be provided with power concentrators 25.

In one embodiment, the AC power is received directly from a power meter (seen at 46 in FIG. 5) at the communicating station 30. The power from the communicating stations 30 may be provided individually or collectively to the switches, bridges, repeaters, router, hubs, and any other switching equipment of the NAN. Additionally, power meters not located at communicating stations 30 may be utilized to provide power to the hubs 26 and other switching equipment.

In one embodiment, the communicating stations 30 or the hubs 26 comprise a power meter monitoring hub 26. The power meter monitoring hub 26 may comprise an RF receiver and an 8-bit microcontroller as well as an RS 232 communications interface and a power supply. The hub may also contain up to four 10-base T ports. On-site configuration is provided by an RS 232 port. Under this embodiment, the monitoring hub receives power consumption data from power meter transmitters and passes it on to the utility company 106 over the transmission system 102.

Each power meter 46 in this embodiment provided with a power monitoring transmitter. The transmitter may be comprised of a PIC microcontroller, a 418 megahertz UHF transmitter, a photo-reflective sensor, and an off-line power supply. The transmitter may use the photo-reflective sensor to monitor rotation of the power meter disk and store the information in nonvolatile memory in the microcontroller. The transmitter transmits the power usage information to the power meter monitoring hub along a 418 megahertz RF link.

In one embodiment, the coaxial cable, as well as the 10-base T wire, is housed within a protective conduit. The system may operate with Linux using an IP chain and masquerading which is considered more effective than using a proxy server.

The bridges 50, in addition to eliminating broadcast traffic, may also receive and regenerate the packets 165 at a higher power level. The repeaters 24 preferably merely amplify the signals carrying the packets 165 and do so without any delay, while the bridges may slow down the packets somewhat.

Referring now to FIG. 3, shown therein is a functional block diagram of a NAN hierarchy scheme 60. Within the scheme 60 is shown the fiber backbone 14 looping in a circuitous manner to form a ring. Within the fiber backbone 14 is a plurality of switches 22. A central switch 22a is shown connected with the central headquarters 20 and through a router 62 to the Internet. Thus, the fiber backbone 14 comprises an outer circuitous backbone. It should be noted that the NAN 10 may have a plurality of gateways 62. Because of the plurality of gateways, any number of ISP providers 32 may provide service to the NAN 10. Other types of service providers and outside entities may also access the NAN 10 through the gateways 62.

Emanating from the switches 22 are components of the local backbone 16 which are arranged in a branched configuration. Thus, shown branching out from each switch 22 is a series of bridges 50, repeaters 24, and hubs 26. Each bridge 50 separates and services a plurality of hubs 26.

Thus, an incoming packet 165 received, for instance over the Internet 34, passes through the router 62. The router 62 uses an IP address 169 shown in FIG. 4a to determine is that the packet is local to the NAN 10. For instance, the IP address may be assigned to the NAN 10 or to the router 62 specifically under a masquerade scheme that will be described.

Figure 4A:
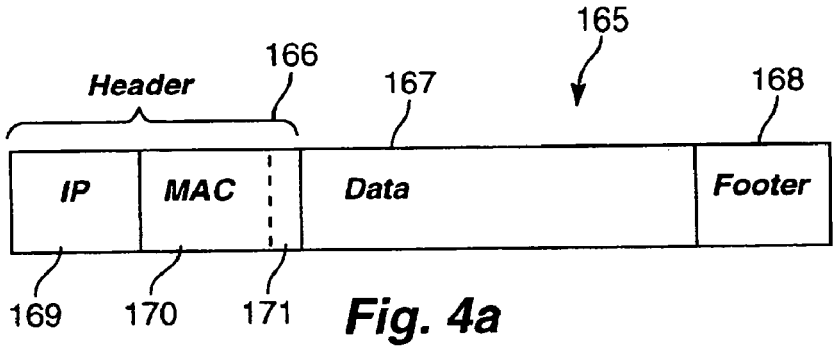
FIG. 4A is a schematic representation of one embodiment of a communications packet of the present invention.

Once the packet 165 reaches the NAN 10, it is routed using a MAC address 170 of FIG. 4a. After passing through the router 62, the packet 165 is received by the central switch 22a. As shown in FIG. 4A, the packet 165 comprises a header 166, a data portion 167, and a footer 168. The header comprises the address of the addressed communicating station 30. The footer contains redundancy information to make sure the packet 165 was properly received. A cyclical redundancy check (CRC) may be used using information in the footer for acknowledgment that the packet 165 was received and has not been degraded.

Within the header 166 may be both an IP address 169 and a MAC address 170. The MAC address 170 refers to a unique number given to each network card 156 of FIGS. 2 and 5. The IP addresses 169 are administered by the Internic agency and are addresses utilized under the TCP/IP protocol. Each station has a unique MAC address. Additionally, each station may have a unique IP address 169.

Nevertheless, because IP addresses 169 are becoming scarce and difficult to procure, a masqueraded system may be employed wherein the router 62 contains a routable IP address or several routable IP addresses and stations 30 within the NAN 10 are addressed by the routable IP address of the router 62 outside the NAN 10. Once addresses containing the masqueraded EP address reach the NAN 10 at the switch 22a, the MAC address 170 may then be used to route the packet 165 within the NAN 10. Indeed, within the NAN 10, routing is preferably exclusively conducted using the MAC address 170.

When communicating on the MAC level, a communicating station 30, in one embodiment, uses a protocol such as an ARP request. The "ARP" request is an address revolution protocol. The ARP protocol talks to the network cards looking for the MAC address. The use of an ARP-type address protocol by the NAN 10 does not adhere exactly to the ARP address protocol but is similar to it.

Thus, the server 18 may be characterized as a modified DHCP server but does not broadcast DHCP as with the prior art systems, though it does maintain the IP-MAC address binding and notifies all subscribing components of that binding. Under this arrangement, when a communicating station 30 comes on-line and receives the non-routable IP address from the server 18, it then binds the IP address. In one embodiment, this is done by populating its registry with the IP address. That is, the IP address is bound to the TCP/IP protocol stack. This IP address is used for TCP/IP protocol communications with stations 72 external to the NAN 10. As discussed, all internal communications are preferably routed using the MAC address.

Of course, the communicating stations 30 could also receive permanent IP addresses either from the server 18 or directly from Internic. These permanent, routable IP addresses may also be maintained within the binding of the server 18.

Figure 4B:
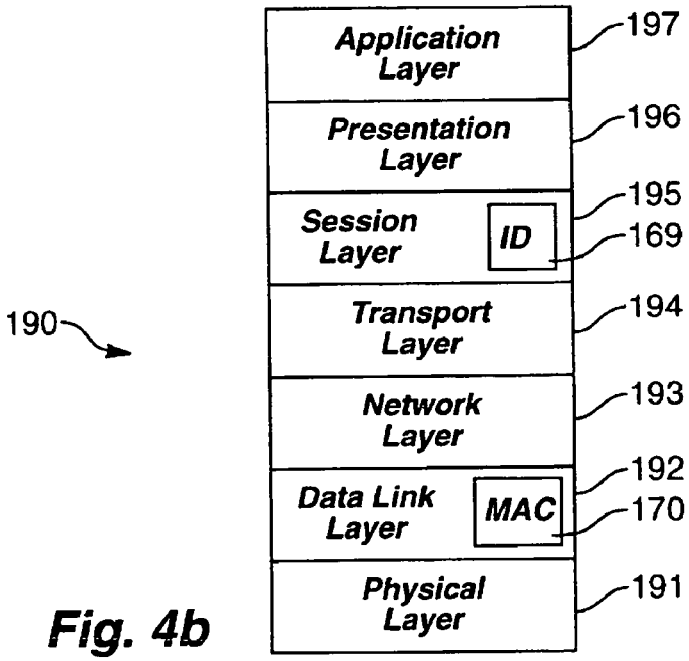
FIG. 4B is a schematic representation of an OSI seven layer model.

Preferably, hubs, bridges and switches work on only the lower two levels of the OSI model of FIG. 4b. When a packet 165 is addressed to go outside of the NAN-10, it is sent to the router 62 which acts as a gateway to the Internet 34 and passes the packet 165 outside the NAN 10. The IP addresses within the communicating stations 30 communicate through virtual ports on the communicating stations 30 but preferably not through the same communicating ports as traditional DHCP protocol standards.

Additionally, the IP addresses are semi-permanent. That is, the communicating stations 30 maintain a single IP address for external communications and do not flood the NAN 10 with requests for DHCP servers to receive IP addresses from. Indeed, because of this substantially, only direct routed traffic exists on the neighborhood, and all broadcast traffic is substantially squelched. Additionally, all traffic is partitioned within its own area and does not travel across the entire network. For this reason, there are substantially less collisions because traffic is much more localized. This also allows the network to service many more communicating stations 30.

The OSI model 190 is shown in FIG. 4b. As shown therein, the OSI-model comprises a first layer 191 known as the physical layer. A second layer 192 is known as the data link layer and it is this layer that predominantly deals with the MAC address 170. A third layer 193 is referred to as the network layer, a fourth layer 194 is referred to as a transport layer, and a fifth layer 195 is referred to as a session layer. The session layer 195 primarily deals with the IP address 169. A sixth layer 196 is referred to as the presentation layer, and a seventh layer 197 is referred to as the application layer. Within the seven layer OSI model, the upper levels allow two communicating stations, one assigned as a client and one assigned as a server, to coordinate communications with each other.

Referring back to FIG. 3, once message traffic 165 is received from the router 62 to the switch 22a, the switch 22a maintains the packet 165 momentarily in a buffer 164 and refers to a database 66 to determine whether the MAC address 170 is local to a partition 169 belonging to the switch 22a. Switch 22a makes this binary determination, and if the answer is yes, passes the packet 165 to a first bridge 50a.

If the answer is no, that is, the traffic is not local to a partition 168, the switch passes the packet 165 in a given direction to a subsequent switch 22. In the depicted embodiment, the given direction is clockwise. Upon passing the packet 165 on, a subsequent switch 22 receives the packet 165 and similarly examines the packet 165 to determine whether it is local or external to a partition 168. If the packet is local to the partition 168, the switch 22 will pass it on to a bridge 50 within a partition 168 to which the switch 22 belongs. If the packet 165 is addressed external to the partition 168 of the switch 22, the switch 22 passes the packet 165 in the given (clockwise) direction to a subsequent switch 22.

Presuming that the packet 165 was local to switch 22a, switch 22a passes the packet to a first bridge 50a. The bridge 50a then holds the packet 165 temporarily in a buffer 64 and refers to a local database 66 to determine whether the packet 165 is local or external to the bridge 50a. If the packet 165 is local to the bridge 50a, the bridge 50a determines which of the hubs 26 connected with the bridge 50a the packet 165 must be routed through.

If the packet 165 is addressed external to the bridge 50a, the bridge 50a passes it to a subsequent bridge 50b. The bridge 50b then receives the packet 165 within a buffer 64 and examines its database 66 to determine if it the packet is addressed to a local station 30. If it is not, it passes it on to subsequent bridges 50 (not shown) in the branching structure of the local backbone 16.

The bridges 50 are typically separated by one or more repeaters 24 to amplify the radio frequency (RF) signals which contain the packets 165. Referring now back to bridge 50a, if the packet 165 was local to bridge 50a, it determines which of the hubs 26 to pass it to. Presuming that the packet 165 was addressed to a station 30a within a hub 26a, the bridge passes the packet to the hub 26a. The hub 26a briefly maintains the packet 165 within a buffer 64 and examines its database 66 to determine which of the subscribing communicating stations 30 the packet 165 belongs to. In this case, it determines that the packet belongs to station 30a and places the packet on a line 40 to be received by a network card 156 located at the communicating station 30a. A similar process would occur with every bridge 50. Thus, for instance, if the packet were addressed to a station 30b, the bridge 50b would receive the packet and transmit to the hub 26b, which would receive the packet 165 and transmit it to the communicating station 30b.

Inter-NAN communications are even more simplified. For instance, if the communicating station 30a wishes to communicate with the communicating station 30b, client software 126 would prepare the packet 165 and place it through the network card 156 onto the NAN 10. The packet 165 would be received by hub 26a which would in turn transmit the packet 165 to the bridge 50a. The bridge 50a would examine the packet once again to determine whether it is local or external to the bridge 50a. If it is locally addressed, the bridge 50a transmits to the appropriate hub 26 connected thereto. If it is not, it directs the packet 165 to another bridge 50 or to the switch 22a, depending on the MAC address 170.

The switching equipment, such as the switches, bridges, and hubs, preferably use a binary tree sorting algorithm to sort through addresses in the attendant databases 66 to determine the location of stations 30 addressed by the packets 165, which greatly enhances the speed thereof. The binary tree, rather than being just a one dimensional look-up table or bubble sort, is branched and allows for larger databases without significant propagation delays. The binary tree is implemented, in one embodiment, using the Nikolas Wirth style that is known in the art.

Note that each bridge 50 also preferably contains its own sub-partition 70 in the partition 68 of the switch 22 to which it subscribes. In this case, when a bridge, such as bridge 50 determines that the packet 165 is local to the partition 68 but not within its own subscribing hubs 26, the bridge 50a passes the packet 165 on to the bridge, e.g. bridge 50b. The bridge 50b then examines the packet 165 and determines that it belongs to the hub 26b and passes it on to hub 26b. Hub 26b in turn examines the packet 165 and passes it on to the communicating station 30b.

If a communicating station 30 such as the station 30a wants to communicate with a computer or entity 72 outside of the NAN 10, it addresses the packet 165 using the IP address 169 of the entity 72. If the outside station 72 wishes to communicate with the station 30a, it also uses an IP address 169 to get into the NAN. This IP address 169 may be either a permanent IP address received from the Internic agency or a masqueraded IP address attributable to the router 62. The outside station 72 sends any return messages using this IP address.

If the masqueraded IP address is used, the router 62 passes the packet 165 to the switch 22a, which then examines the MAC address 170 without having to refer to the IP address. Thus, one difference between bridges 50 and the routers 62 of the present invention is that a bridge 50 reads only at the MAC level while a router 62 reads at the IP level.

The outside station 72 could also be part of a NAN other than the NAN-10. The outside station 72 could communicate using MAC addresses to other outside stations 72 within its own NAN, but once it wished to communicate with an entity outside its own NAN such as the communicating station 30a, it then must use an IP address to pass packets 165 through the Internet with the use of routers 62.

As presently contemplated, each NAN 10 may have 10,000 or more communicating stations 30. A community having more than 10,000 locations wanting to subscribe to the NAN 10 would require more than one NAN 10. Additionally, under the present system, this maximum number may be increased by increasing the speed of the local backbone 16. The speed of the local backbone may be increased up to, for instance, a gigabit per second of throughput without having to reinstall the communicating lines. To increase the number of subscribing communicating stations 30 within a NAN-10, the firmware constituting the software within the client stations server, hubs, bridges and switches are replaced, in an operation that is substantially transparent to the communicating stations 30.

Stations within the different NANs preferably communicate with each other over the Internet, as discussed. Nevertheless, within each NAN communications are routerless in the preferred embodiment.

Presently, the standard for communications on the inner backbone 16 is 10-base-T, whereas the fiber communications on the fiber backbone 14 are set at 100-base-T. NAN 10 communications preferably utilize the Ethernet 802.3 standard which is the standard presently relied upon by most Internet and network organizations. The Ethernet 802.3 standard is used in one embodiment of the NAN for packet encapsulation for transfer of the packets 165 over communication lines 36, 38.

In order for a new communicating station 30 to be admitted to communicate on the NAN 10, it must first establish communications with the server 18. The server 18, as described, maintains a binding between IP addresses and MAC addresses. The client software 126 which is installed on every communicating station 30 provides the communicating station 30 with the proper MAC address of the server 18. Thus the communicating station communicates with the server 18 to receive a localized non-routable IP address for use in communications external to the NAN-10.

In one embodiment, the communicating station 30 may be given a permanent IP address issued by Internic or may be given a non-routable address and use the masquerading procedure discussed above. Additionally, there may be several different types of IP addresses issued. As discussed, routable and non-routable IP addresses may be issued as well as filtered IP addresses that filter content received from the Internet. Additionally, an IP address may be partially or fully functional depending on whether the communicating station 30 has paid a monthly or yearly fee.

Every station 30 checks in with the server 18 at the initial login in one embodiment, but if the server 18 is not functioning, the stations 30 may still continue to operate with the previously issued IP address. E-mail messages may be sent to a permanent IP address, or may be routed in the manner of outside station 72 communications as discussed above.

Figure 5:
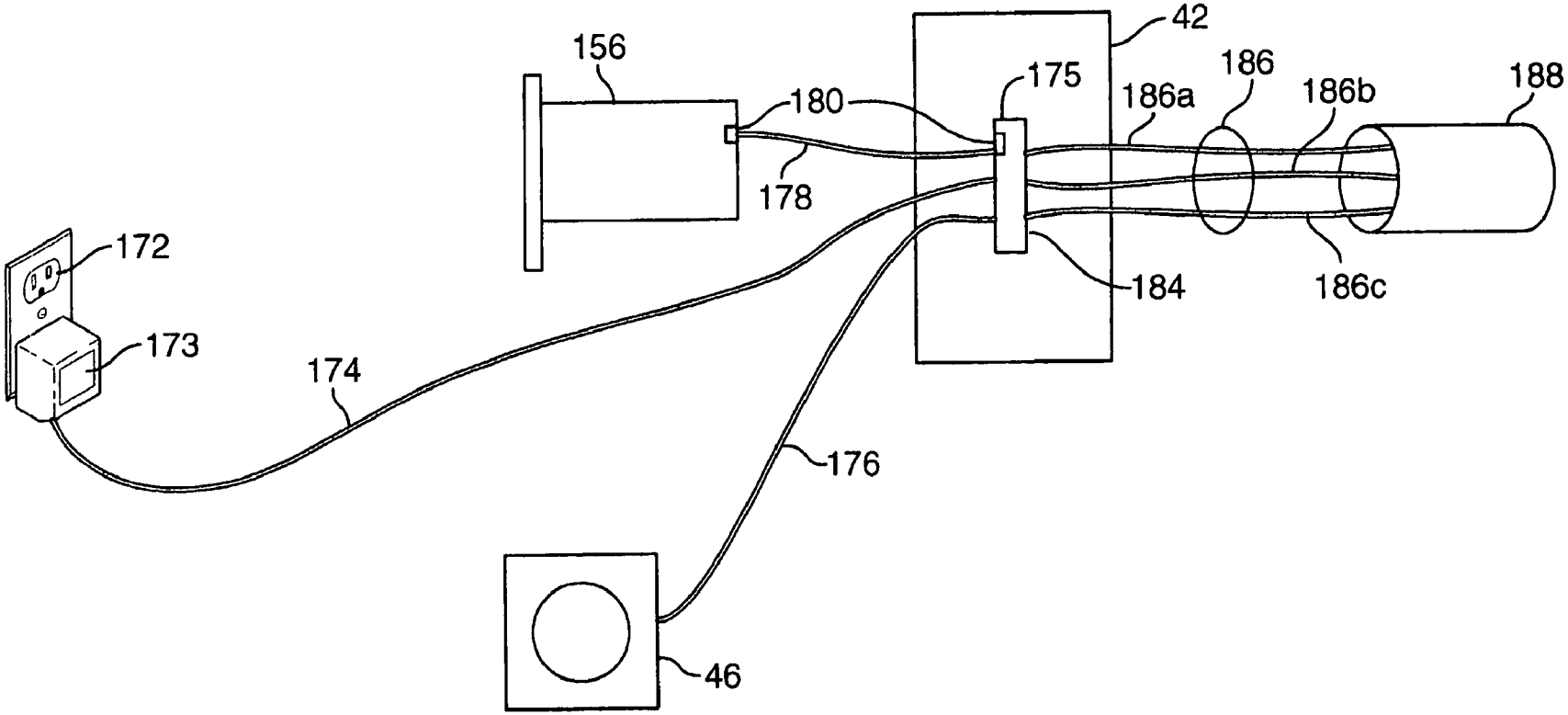
FIG. 5 is a schematic representation of a manner of connecting a communicating station to a communications node of the present invention.

Shown in FIG. 5 are the contents of a typical home connection box 42, including a power coupler 184. The home connection box 42 may comprise a protective housing 182. Within the housing 182 is shown a power coupler adapter 184. Connected to the adapter 184 is a wire 174. The wire 174 emanates from a transformer 173 which is in electrical communication with a power outlet 172. Also shown is an RF wire 176 carrying transmitted signals from the power meter 46. Of course, power consumption may also be transmitted over air waves as discussed above. The network card 156 is shown connected with the adapter 184 with the use of standard Ethernet cable 178 which is plugged into jacks 180.

The network card 156 is preferably a standard 10-base-T Ethernet network card. The adapter 184 also has shown connected thereto a set of wires 186. One example of a network card 156 suitable for use with the present invention comprise a standard Ethernet 10-base T network card such as the CN2000 card available from CNET of Milpitas, Calif.

A pair of first twisted pair wires 186a contains transmit information and a second set of twisted pair wires 186b contains received information. A third set of twisted pair wires 186c carries AC power to the power concentrator and to a node 26. A protective conduit 188 covers the wires and protects them from the elements. The protective housing 182 is preferably mounted to the outside of the home or building within which the communicating station 30 is located.

Figure 6:
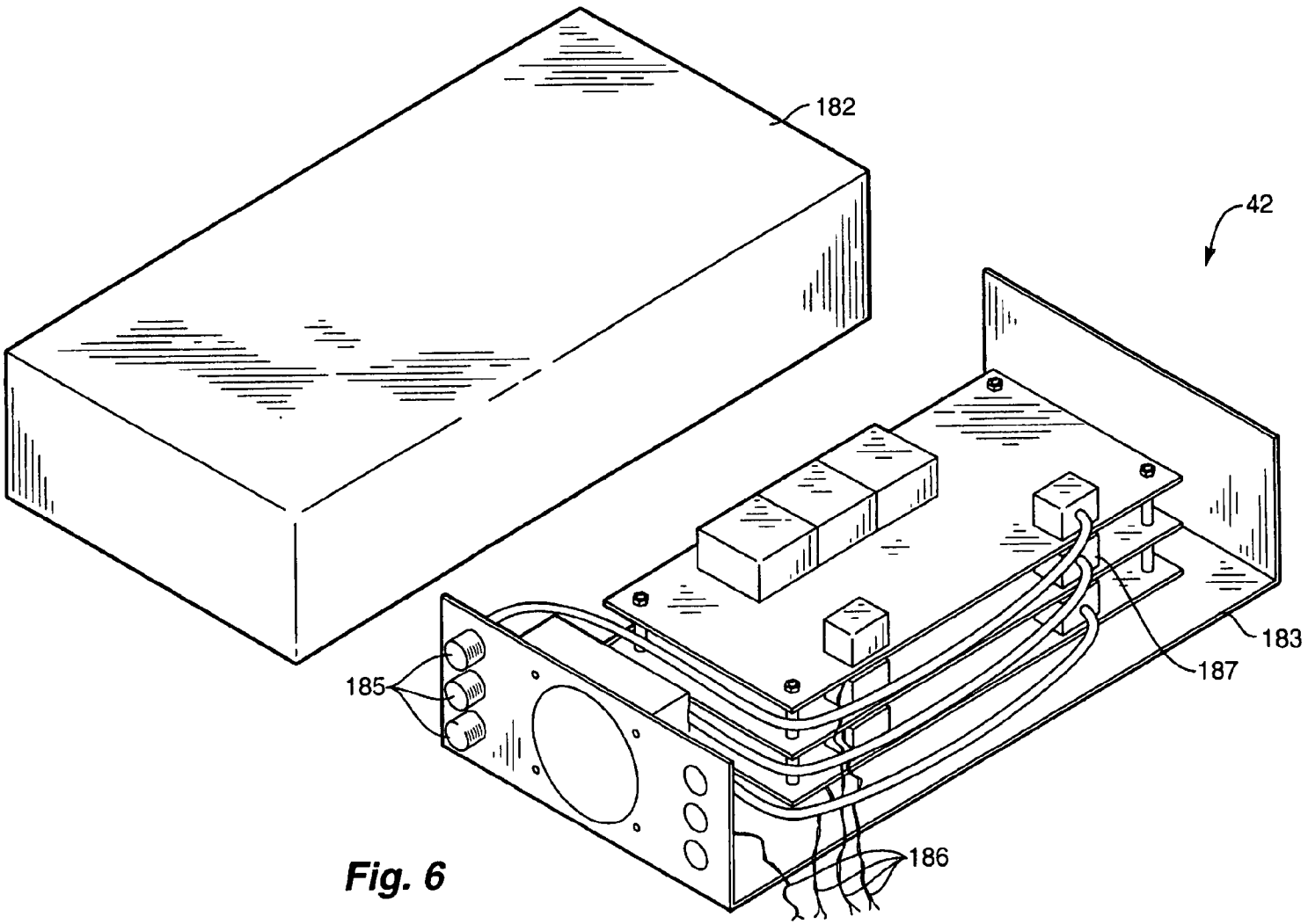
FIG. 6 is a perspective view of a connection box of the present invention.

Shown in FIG. 6 is one embodiment of the home connection box 42. Shown therein is a base 183 containing therein the adapter 187. The protective housing 182 is adapted to fit over the base 183. Jacks 185 are shown for receiving the wires 178, 174, 176 of FIG. 5. The outgoing wires 186 are also shown. Wiring is preferably labeled and connected on an alphabetical basis.

Shown within the central headquarters 20 is a statistics checker 158 for receiving information from the semi-intelligent repeaters 24. The stats checker 158 receives the information from the repeaters 24 and determines that the repeaters 24 are online and functioning properly. A report may be generated by the statistics checker 158 and warnings may be sent to an operator in real time.

The hubs 26 are connected to the coaxial cable 38 with a T-connector so as not to break the connection. The hubs convert from coaxial cabling to twisted pair wires and provide collision detection as well as amplification.

Client software 126 provides an arrangement similar to a DHCP client, but contrary to DHCP clients of the prior art, the client software 126 does not broadcast and does not lease an IP address, but rather, contains a permanent or semi-permanent IP address. This keeps the network uncluttered. This is allowable because the DHCP client can be identified by the MAC address and routable IP addresses. Indeed, standard DHCP servers and broadcast traffic are not allowed on the network. In one embodiment, standard DHCP servers and broadcast traffic that do repeatedly transmit broadcast traffic are found and crashed or otherwise disallowed on the network.

The server 18 is preferably a DHCP-type server which performs management tasks including keeping track of and handing out IP addresses. The customers use a password to get their initial IP address. Once the communicating stations 30 receive their IP address 136 they may talk on a TCP/IP layer. A binder utility 157 may reside within the central headquarters. The binder utility 157 in one embodiment binds the IP address with the MAC address and may be used as a guarantee of customer payment.

The DHCP server and the DHCP clients talk at the MAC layer. Under the OSI standard model, this is the first and second layer. Then once the IP address is picked up, they may communicate at different layers such as the TCP/IP layer. Hubs and repeaters preferable communicate at the MAC layer while the server 20 ensures that a machine with a given MAC address has the assigned IP address and maintains this binding.

Thus, by eliminating broadcast traffic and making the NAN 10 essentially a routerless network, the NAN 10 can be operated at high speeds and on large scales. Only specific types of traffic are allowed to travel the NAN, further maintaining the high speed of the NAN. Under the present invention, the NAN determines what can travel thereon, rather than what cannot travel thereon as in the prior art. Indeed, the NAN 10, including the switches, bridges and wires, operates outside of the standard "mold" of networks because its implementation does not follow IEEE or other standards.

The high speed of the NAN 10 of the present invention is attributable to a number of cooperating factors. For instance, rather than adhering to standard IEEE standards such as the Cat5 standard, packets are transmitted with greater power and can be transmitted up to 1500 feet using a higher power level and more sensitive receiving equipment before being picked up. This provides a longer acknowledgment time, and because the packets are directly routed using the local/external method described above, the packets are on the NAN for shorter periods of time causing less collisions.

Hubs, similar to the bridges, also restrict local traffic and do not pass it on to the NAN 10 but contain all traffic that is local to that hub. Typically, bridges may be located four repeaters from each other and may service about five hubs. Each hub may service about five communicating stations 30.

Each switch and bridge regenerates the packet 165, whereas the hub holds the packet in a buffer and may or may not regenerate the packet 165 depending on the level of amplitude of the packet.

The local partitioning and high rate of speed of the NAN 10 are enabled to a large degree by a unique firmware residing within the switching components. This unique firmware includes a tree structure sorting algorithm within the switching components. Initially, the novel firmware is much simplified in that the decisions are binary. That is, the switching components determine whether a packet is addressed local or external. Additionally, the databases are larger and hold a greater number of MAC addresses. In one embodiment greater than 800 MAC addresses are be contained within the databases 66. In a further embodiment, greater than 10,000 MAC addresses are contained, and in a further embodiment, 15,000 or more MAC addresses are contained.

The NAN 10 keeps traffic local and partitioned and, as described, kills all broadcast traffic at the bridges. Typically, the broadcast traffic doesn't make it past the bridges to the switches, but the switches may also kill any broadcast traffic.

The firmware also processes packets 165 in a unique manner using a distance vector algorithm that allows the packets 165 to travel further without being regenerated. The firmware allows reduction of collision rates. Nevertheless, the packets 165 don't travel as far because they are held more localized by the bridges which have larger databases. Thus, the NAN 10 is characterized more by what cannot travel it than what can travel it.

Figure 7:
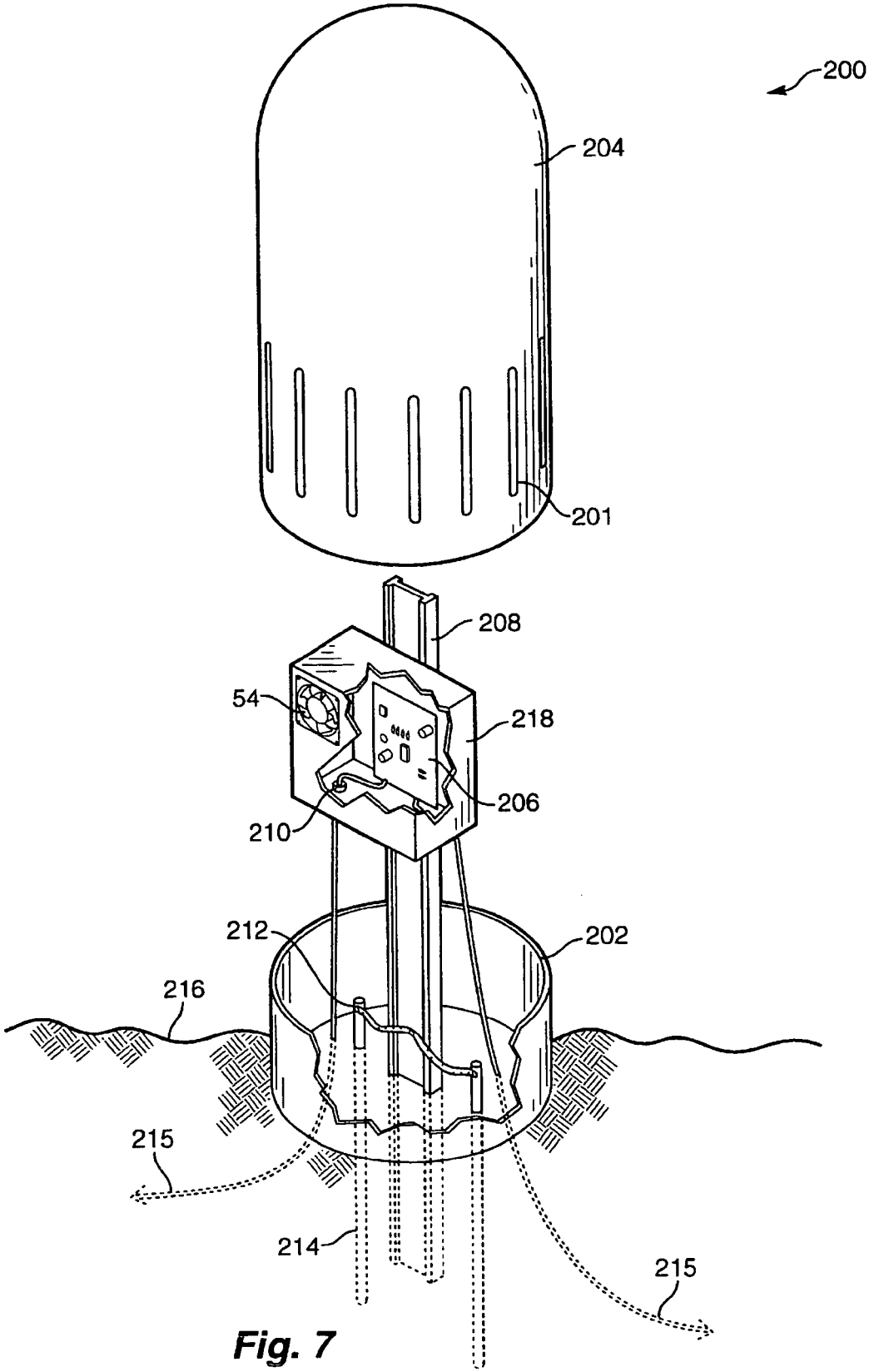
FIG. 7 is a partially exploded perspective view of a pedestal of the present invention.

Shown in FIG. 7 is an earth-based pedestal 200 of the present invention. The pedestal 200 comprises a pedestal base 202 which is mounted within the earth 216 a distance of at least several inches. A cylindrical outer housing 204 is shown and is provided with site 201 for air-circulation. The cylindrical outer housing 204 is inserted over the base 202 to protect a circuit board 206 housed therein. The circuit board is mounted within a Faraday shield 218 which may be a partial chassis or a cage.

The Faraday shield 218 is connected with a post 208 and is mounted within the ground a distance of approximately 1.5 feet. The post 208 is connected with copper braid wiring 212 to a pair of steel rods 214 which are mounted about 8 inches apart and approximately 3 feet in the ground. This provides adequate ground charge and lightning protection for the circuit board 206.

The circuit board 206 typically comprises the contents of a node 26, a repeater 24, or bridge 50. Emanating through openings 210 in the Faraday shield 218 are a pair of communications wires 215. Communications wires 215 may comprise a coaxial cable 28, a twisted pair cable 40 and/or the fiberoptic cabling 36 and are preferably routed underground. In this manner, the nodes 26, feeders 24, and/or bridges 50 may be housed outside and are protected from the elements with the use of the pedestal 200.

Figure 8:
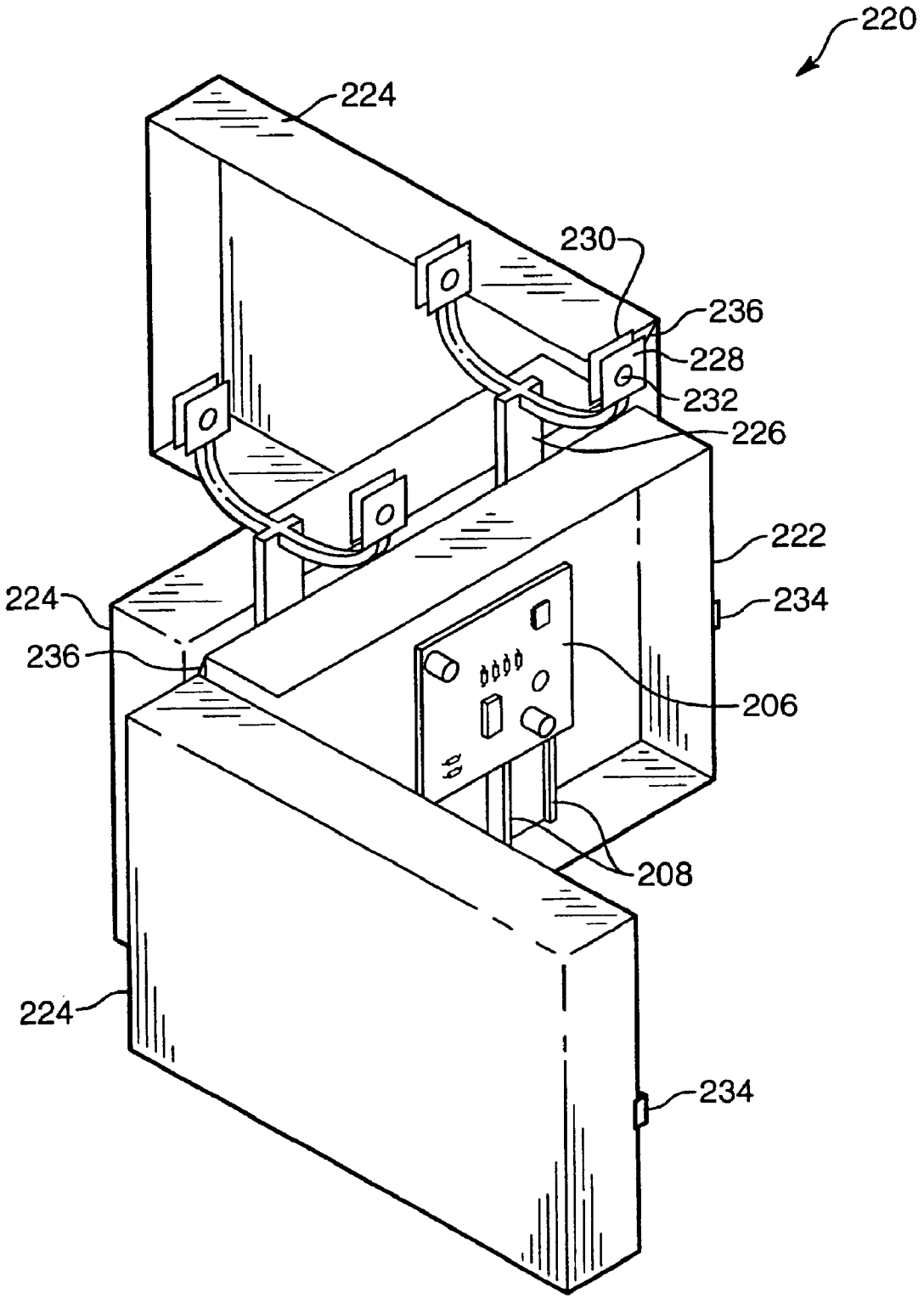
FIG. 8 is a perspective view of a hanging pedestal of the present invention.

An alternate embodiment of a pedestal, shown in FIG. 8 is a hanging pedestal 220. The hanging pedestal 220 is adopted to hang from locations such as power or telephone lines or poles. The hanging pedestal 220 is shown comprising a base 222 and a lid 224. In the depicted embodiment, two hanging pedestal bases 222 and lids 224 are shown separated by a hanger mount. The hanger mount 226 as depicted is comprised of a pair of hanging brackets 228. The hanging brackets 228 comprise a pair of plates 230 which are tightened in proximal contact around a line from which hanging pedestal 220 is hung with bolts 232. The base and lid may be hooked together with plastic hinges 236 and may latch with a snap-fit type latch 234. The hanging pedestals also house an electronic circuit board therein which is accessed through a set of cables 208.

Additional applications of the NAN 10 include video connecting, voice, video, cable TV, etc. Real time video may be provided on-demand rather than just being started every hour. The video may be downloaded in buffered portions and cached in part or in all on a memory device at a particular communicating station 30 which ordered the video. Sporting events may be archived for later viewing, and other real time events may be provided through a window frame within a monitor or screen of the communicating station 30. Home education may be provided as may be books, such that the service provider 104 may comprise a virtual library.

Figure 9:
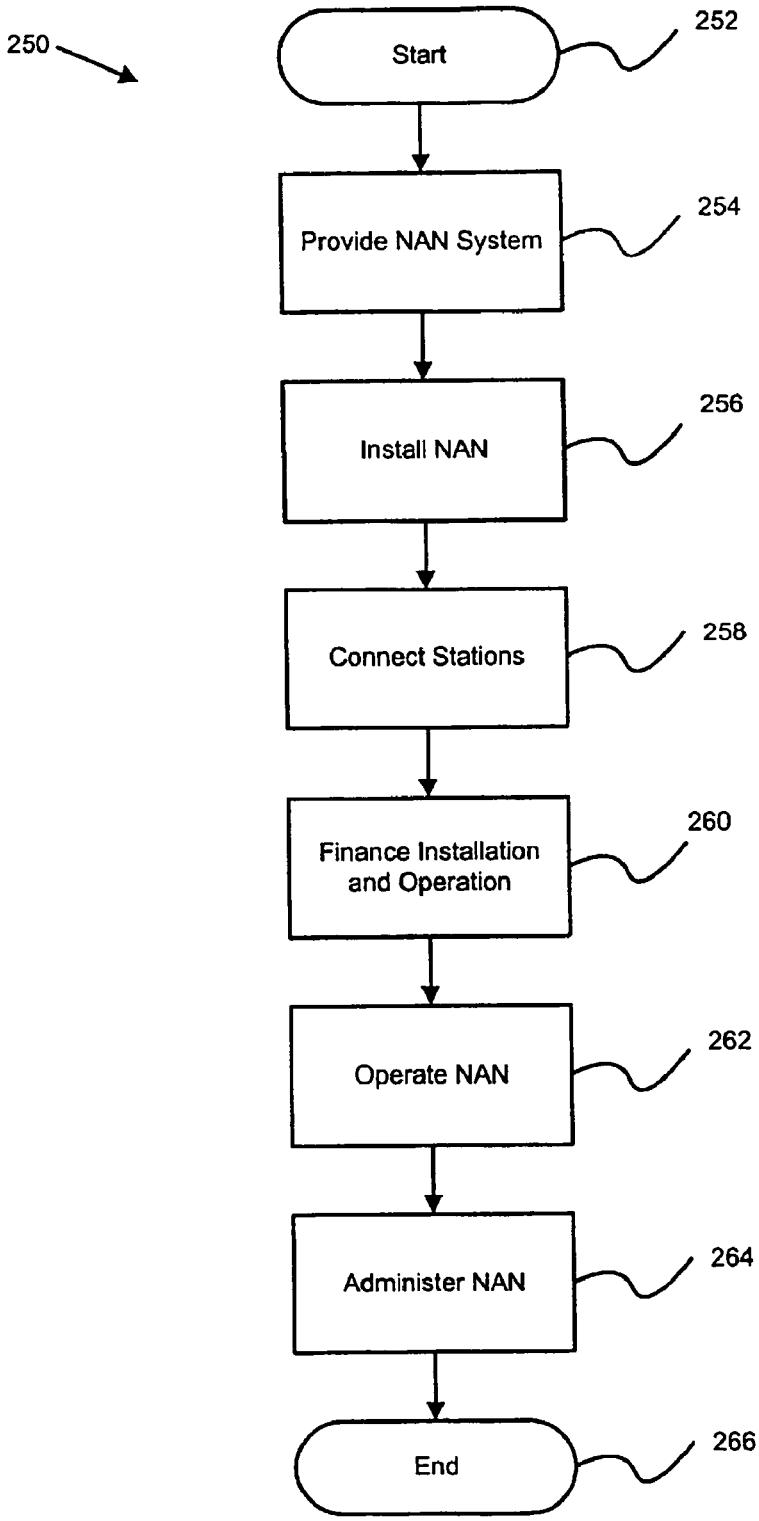
FIG. 9 is a schematic flow chart diagram listing steps of a method of operating a NAN of the present invention.

FIG. 9 is a schematic block diagram illustrating one embodiment of a general method 250 of operation of a NAN. The method 250 begins at a start step 252. Subsequently, at a step 254, a network such as a NAN system is provided. Preferably, the network is configured in the manner described above for the NAN 10. At a step 256, the network is installed. Preferably, this means that a NAN 10 of the present invention is installed as described above and as will be described below in greater detail.

At a step 258, communicating stations 30 are connected to the network 10. Preferably, the communicating stations comprise a plurality of businesses, organizations, and/or individuals related primarily or exclusively by residence within a common geographical location. At a step 260, installation and operation of the NAN are financed. This step will be discussed in detail below, but briefly, the installation is preferably financed, at least in part, by a utility company, and operations are preferably financed by periodic subscription fees.

At a step 262, the network, e.g., NAN 10, is operated. Operation of the network 10 preferably takes advantage of the unique configuration of the NAN 10. For instance, power is preferably cooperatively supplied from communicating stations, messages are directly routed, and localized message traffic such as advertising and security observation is routed over the network 10.

At a step 264, the network 10 is administered. Preferably, the network administration is provided by a private company other than the utility company that assisted in financing the installation. Administration preferably comprises billing and such matters, and is preferably conducted on behalf of cooperative ownership and management of the network. At a step 266, the method 250 ends.

Figure 10:
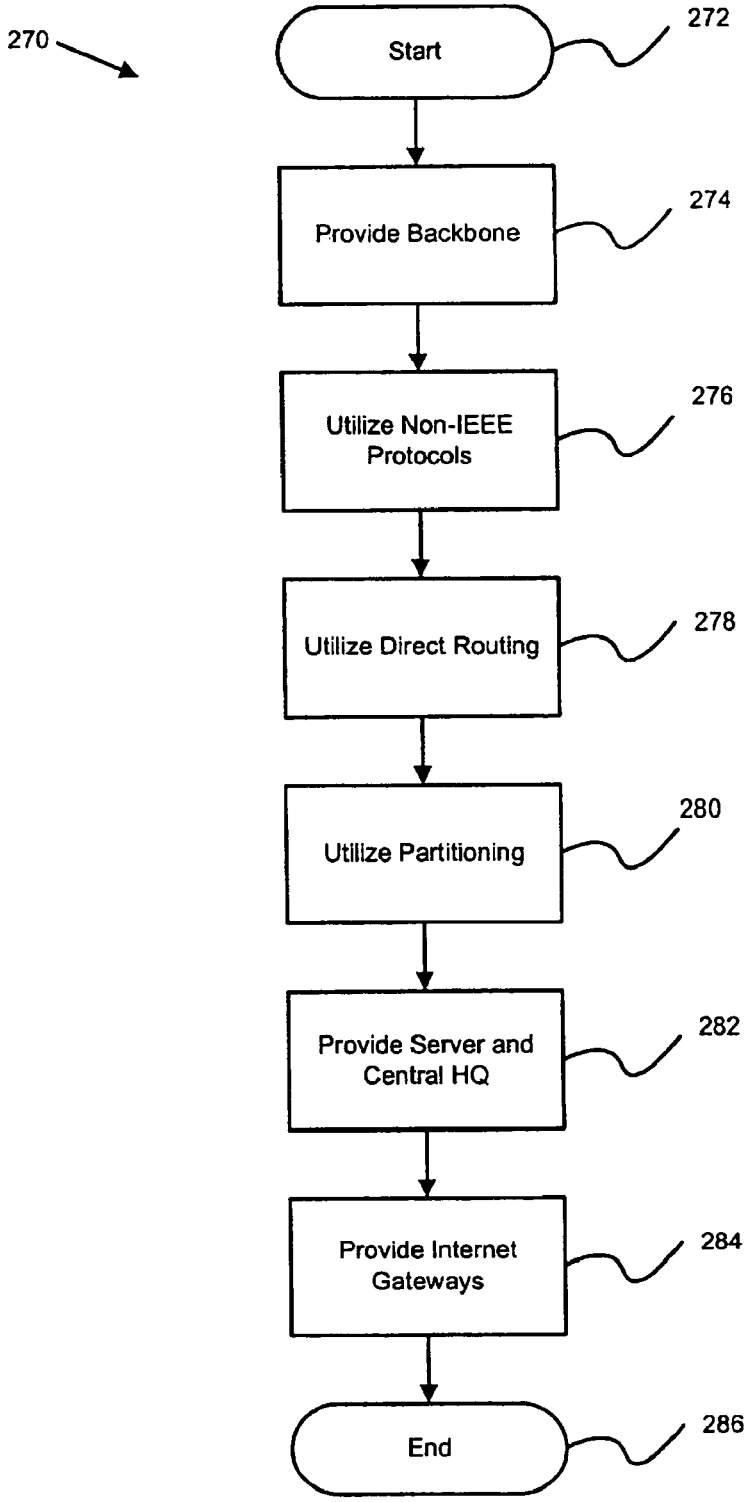
FIGS. 10 through 15 are a schematic flow chart diagrams describing in greater detail steps that may be conducted in accordance with the method of FIG. 9.

Providing a NAN system 10 of step 254 of FIG. 9 may be conducted in accordance with a method 270 of FIG. 10. The method 270 begins at a step 272 and progresses to a step 274. At step 274, a backbone is provided. Preferably, the backbone comprises a fiber backbone 12 as described above. Thus, the backbone 12 is also preferably formed in a loop circling through a geographic area which the NAN 10 is intended to serve.

The method 270 may also, as depicted by a step 276, comprise utilizing protocols that are not recognized standards, and particularly, that are not IEEE standards. By dispensing with IEEE standards, greater speeds and flexibility can be achieved, as discussed above. As depicted by a step 278, the method 270 may also utilize direct routing of messages. The direct routing is preferably achieved in the manner discussed above, with switching equipment and cables branching from a central backbone 14. The network 10 is also preferably partitioned, at a step 280, preferably in the manner described above, such that any particular message goes directly to and stays within a partition 70 corresponding to a station 30 to which the message is addressed.

A server 282 is optional, but may provided, as indicated by a step 282. The server preferably corresponds to the server 18. Additionally, a central HQ 20 is preferably provided. One or more Internet Gateways may also be provided, as indicated by a step 284. At a step 286, the method ends.

Figure 11:
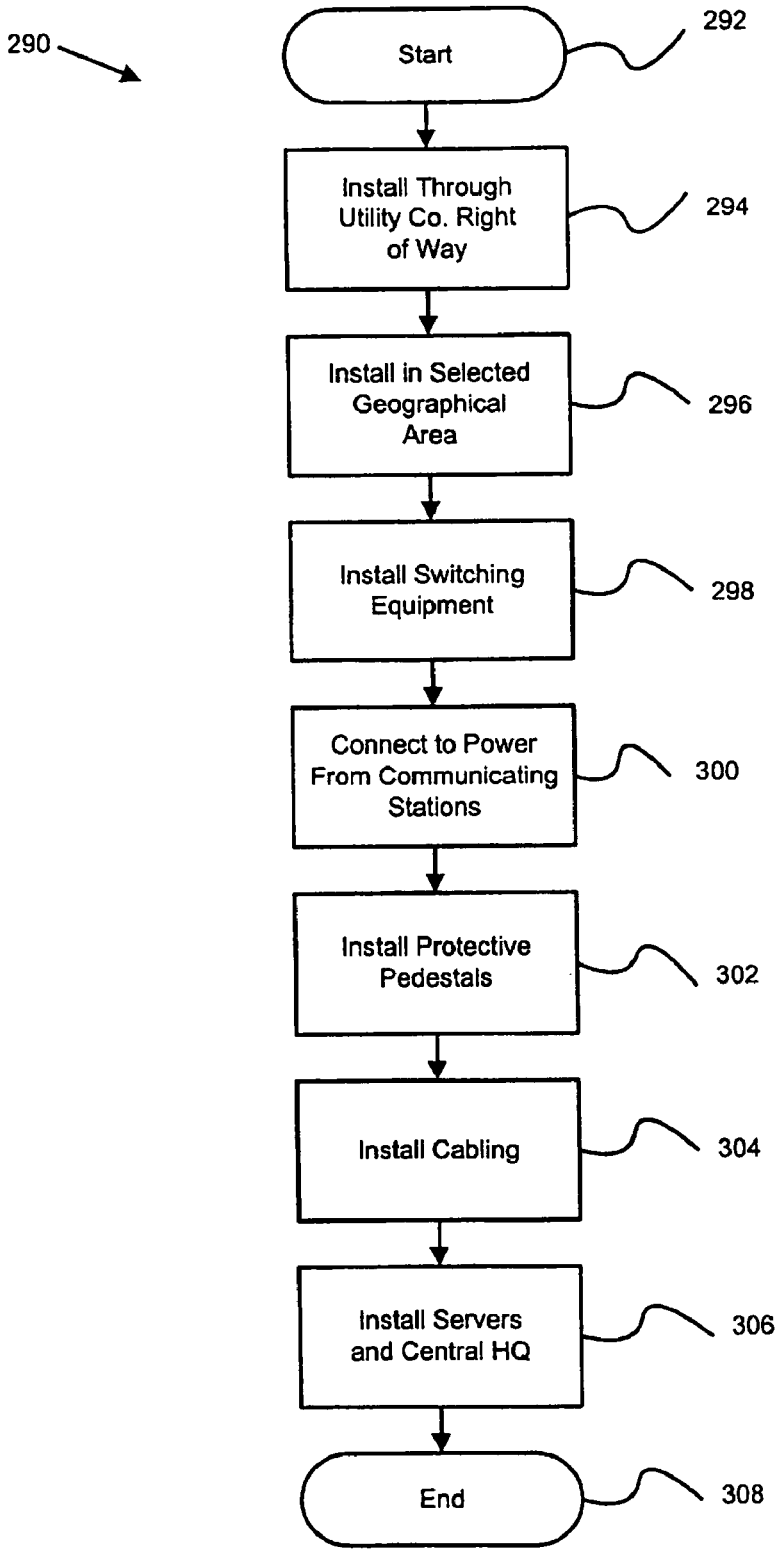

Installing a NAN 10 of step 256 of FIG. 9 may be conducted in accordance with a method 290 of FIG. 11. The method 290 begins at a start step 292. As indicated at a step 294, the method 290 preferably comprises installing at least a substantial portion of the cabling 36, 38, 40 of the NAN 10 within a right of way belonging to a public utility service provider company. In one embodiment, the public utility service provider comprises a power company.

At a step 296, the NAN 10 is installed within a selected geographical area. Preferably, the geographical area comprises a municipality, and more preferability, a portion of a municipality, such as a neighborhood. As indicated at a step 298, switching equipment is installed. The switching equipment preferably includes the fiber switches, the repeaters, the bridges 30, and the hubs 26. In one embodiment, at least a substantial portion of the switching equipment is installed out of doors, preferably within containment units 52 or protective pedestals 200, 220.

At a step 300, the switching equipment is preferably connected to power sources located at the communicating stations 30. Preferably, the communicating stations 30 cooperatively and redundantly provide the power to switching equipment as discussed above. Thus, external power sources may not be needed, and if power goes out or is terminated at a single communicating station 30, power can be supplied by the other communicating stations 30. Preferably, the delivery of power is coordinated by a power concentrator 25.

At a step 302, the protective pedestals 200, 220 are preferably provided for housing the switching equipment. At a step 304, the cabling 36, 38, 40 is provided, preferably by burying the cabling within the rights of way of the utility company.

At a step 306, the server 18 and the central HQ computer 20 are provided. Of course, other steps will be necessary to completely install the NAN 10, but will be readily apparent to those of skill in the art from the present description. At a step 308, the method 290 ends.

Figure 12:
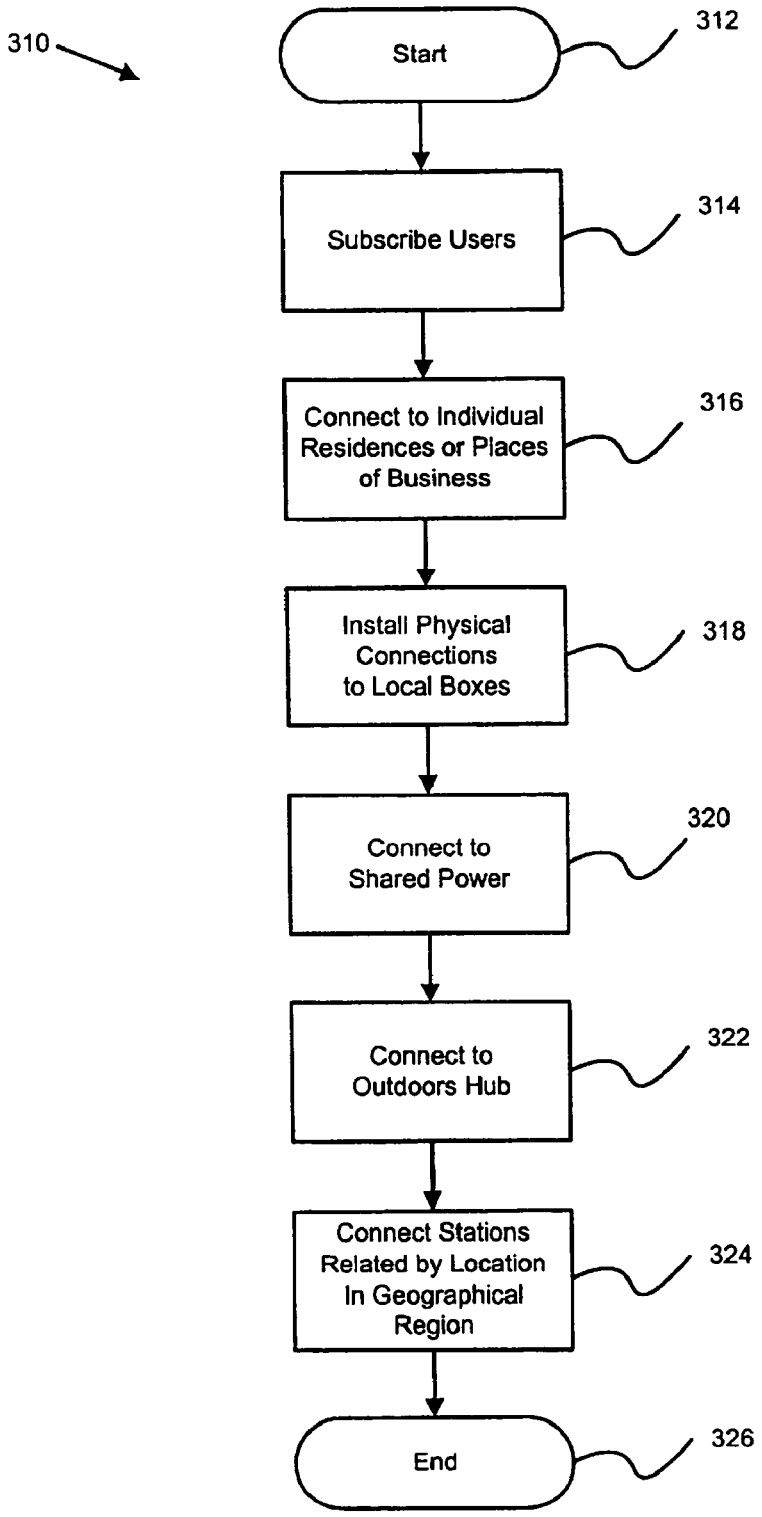

Connecting stations of step 258 of FIG. 9 may be conducted in accordance with a method 310 of FIG. 12. The method 310 begins at a start step 312 and progresses to a step 314. At the step 314, users subscribe to the NAN service (and) or Internet service. That is, users such as individuals at residences, businesses, schools, and other organizations at the various communicating stations 30 subscribe to receive NAN-service. The subscribing is preferably conducted prior to installing the relevant switching equipment in the NAN of the subscribers.

At a step 316, the NAN is connected to individual residences or places of business. Unlike most limited distribution networks, the NAN 10 is preferably connected to multiple residences, businesses, and/or organizations. In installing the NAN, connections are preferably made to each building in which is housed one or more communicating stations 30. Preferably, in a step 318, each communicating station 30 is provided with a home connection box 42 to which the NAN cabling and switching equipment is connected.

At a step 320, the switching equipment local to each communicating station 30 is connected with the communicating station 30 to receive power from the communicating station 30. Thus, power delivery is shared by groups of communicating stations 30 as described above.

At a step 322, a plurality of communicating stations 30 are preferably placed in communication by a connection to common switching equipment such as a node or hub 26 of FIG. 1. Preferably, the switching equipment is located out of doors in a centralized location, and more preferably, is located within a ground-based pedestal 200 or a hanging pedestal 220.

As indicated by a step 324, installation of the NAN 10 preferably comprises connecting together in the NAN 10 only communicating stations 30 related by location within a common geographical area. The geographical area may be any selected area, but preferably comprises a municipality, plurality of municipalities, or portions thereof such as common neighborhoods. At a step 326, the method 310 ends.

Figure 13:
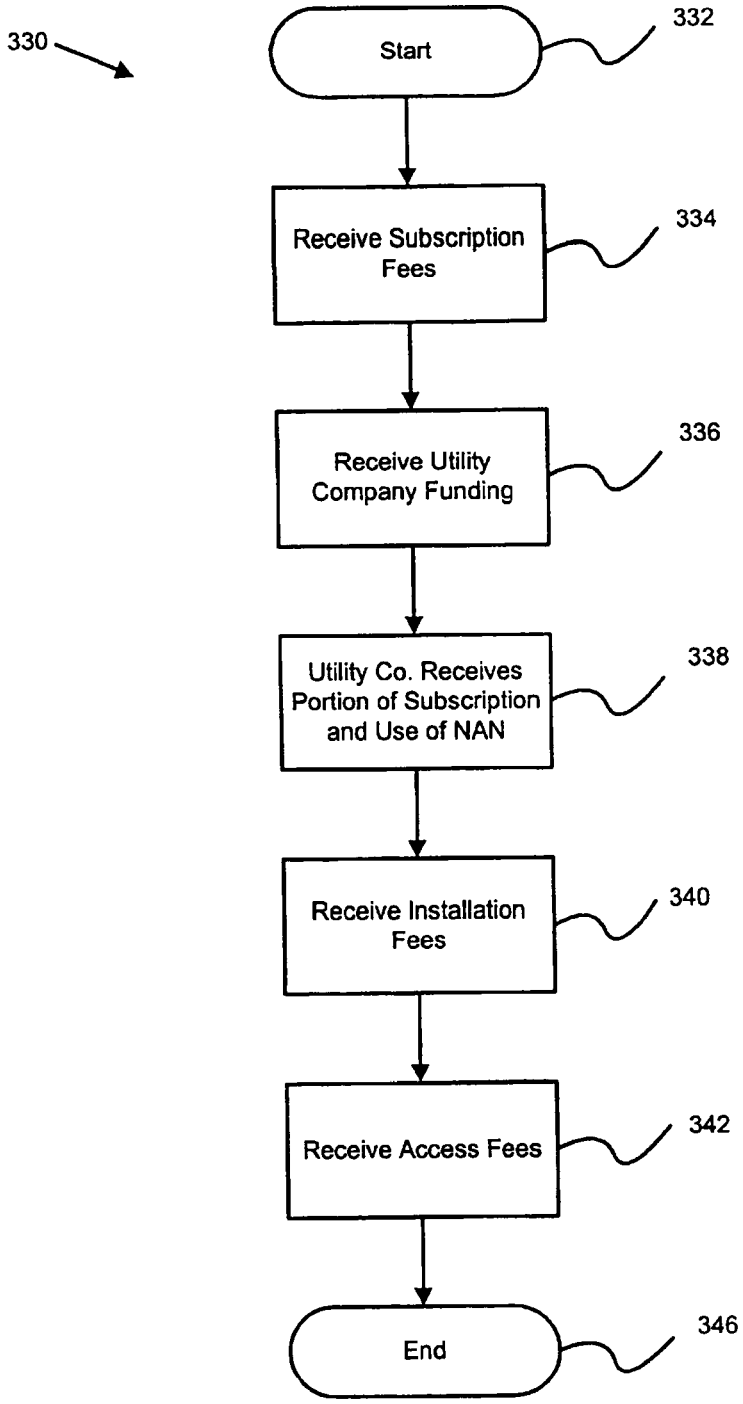

Financing installation and operation of a NAN system of step 260 of FIG. 9 may be conducted in accordance with a method 330 of FIG. 13. The method 330 begins at a start step 332 and progresses to a step 334. At step 334, subscription fees are received from users at the communicating stations 30. Preferably, the users are subscribed prior to connecting the communicating stations 30 to the NAN. The fees are preferably paid periodically and the proceeds used to maintain and administer the NAN and recompense the providers of the NAN system 10 as well as possibly to help compensate an alliance organization such as the utility company that has assisted in financing the advertising of and installation of the NAN 10.

As indicated by a step 336, the NAN 10 may also be in part financed by a utility service provider company. In one embodiment, the utility service provider company is other than a telecommunications company. By receiving assistance from a gas, power, water company or the like, these utility service providers that are otherwise unable to participate in the expansion of digital communications can be a part of this growth. Thus, in one example, a power company allows the NAN 10 to be installed in rights of way granted to the power company and may also in part or whole finance the installation. Solicitation of users may also be financed by an alliance organization such as a utility service provider company.

As indicated by a step 338, the utility service provider company or other alliance organization receives a portion of the subscription fees received in step 334 to compensate it for its costs of installation and solicitation. Additionally, the utility company is also preferably provided with use of the NAN to accomplish tasks such as reading utility meters at the communicating stations 30 and billing the communicating stations 30 for use of the utility services.

Additionally, as indicated by a step 342, companies making use of the NAN may be charged. For instance, content providers, Internet service providers, advertisers, and the like may be charged for their use of the NAN 10. At a step 346 the method 330 ends.

Figure 14:
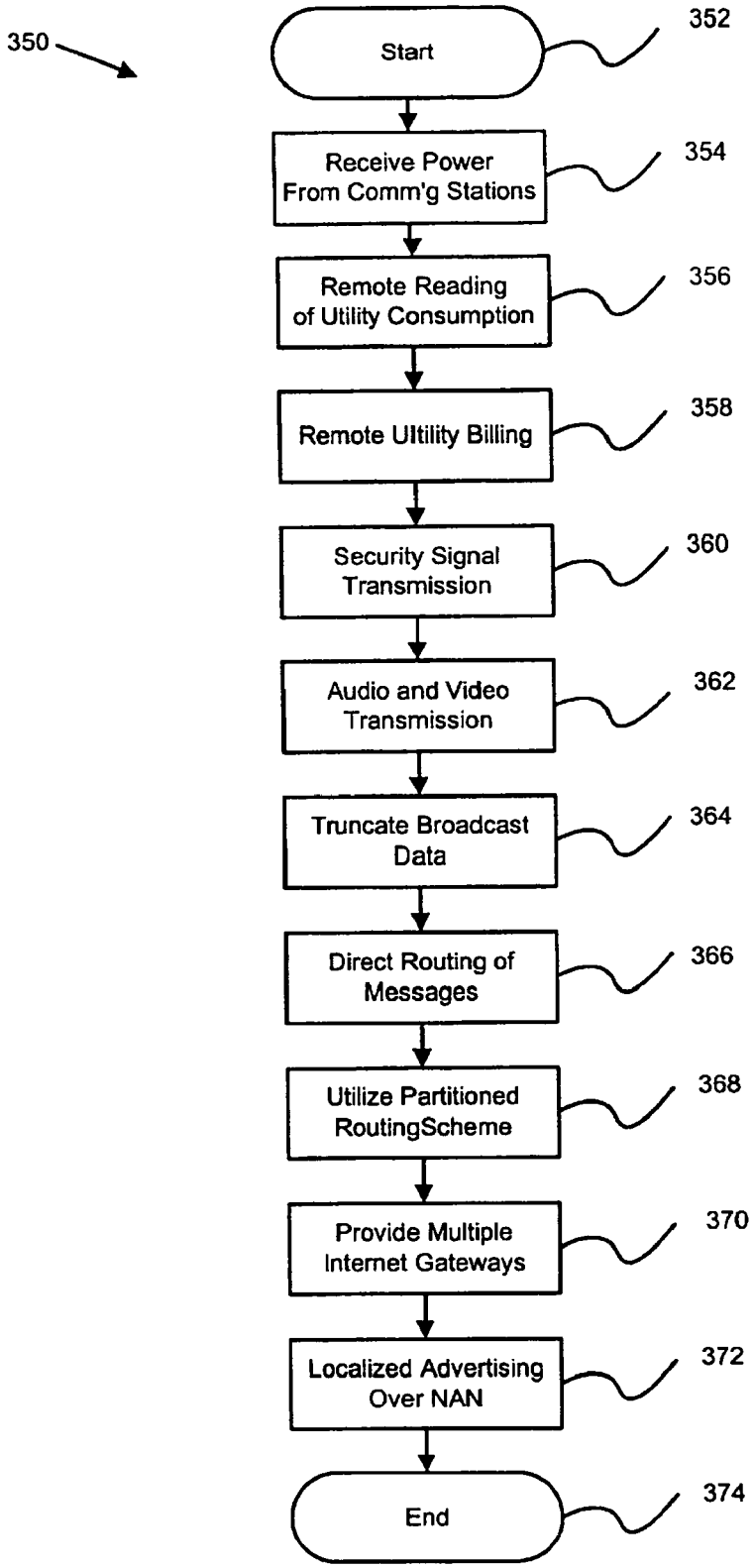

Operating a NAN system of step 262 of FIG. 9 may be conducted in accordance with a method 350 of FIG. 14. The method 262 begins at a start step 352 and progresses to a step 354. As indicated, the operation of the NAN may comprise receiving the power to operate the switching equipment cooperatively from the communicating stations 30. As indicated by a step 356, the method 362 may comprise remote reading of utility consumption as described above.

As indicated by step 358, the method 350 may comprise remotely billing users at communicating stations 30 for utility services. As indicated by a step 360, the method 350 may comprise transmitting security signals over the NAN 10. Thus, for instance, when the communicating stations 30 are provided with security systems 46 such as cameras, sensors, or the like, monitoring of the cameras or sensors or other surveillance equipment can be conducted by transmitting signals therefrom over the NAN 10 to a central surveillance office which itself comprises a communicating station 30.

At a step 362, audio and video signals may be transmitted over the NAN 10. Thus, for instance, music may be piped into residences or businesses over the NAN 10 and video signals such as live feeds and recordings may likewise be transmitted over the NAN 10. While the television signals may be broadcast, more preferably, the video signals are provided to requesting stations 30 on-demand. Video conferencing may likewise be provided.

At a step 364, broadcast data is truncated or otherwise eliminated from the NAN 10. This is preferably conducted in the manner described above.

At a step 366, messages are directly routed from sender to receiver over the NAN. Once again, this is preferably conducted in the manner described above.

At a step 368, routing of messages utilizes partitions of the NAN. In preferred embodiments, the partitioning is conducted as described above.

At a step 370, a plurality of Internet gateways are provided for connecting the NAN with Internet service. While a single Internet gateway may be provided, it is preferred that several are provided to promote competition and lower prices.

At a step 372, localized advertising is transmitted over the NAN. Thus, for instance, a communicating station 30 may comprise a local business within the geographical area which the NAN encompasses, and may wish to transmit advertising to other communicating stations 30. Such advertising may be accomplished by directing advertising directly to selected communicating stations 30, which are more likely to be interested in the advertising due to the close proximal location of the advertising business. Of course, the discussed steps of the method 350 are given by way of example, and many other manners of operating a NAN of the present invention will be readily apparent to those of skill in the art. At a step 374, the method 350 ends.

Figure 15:
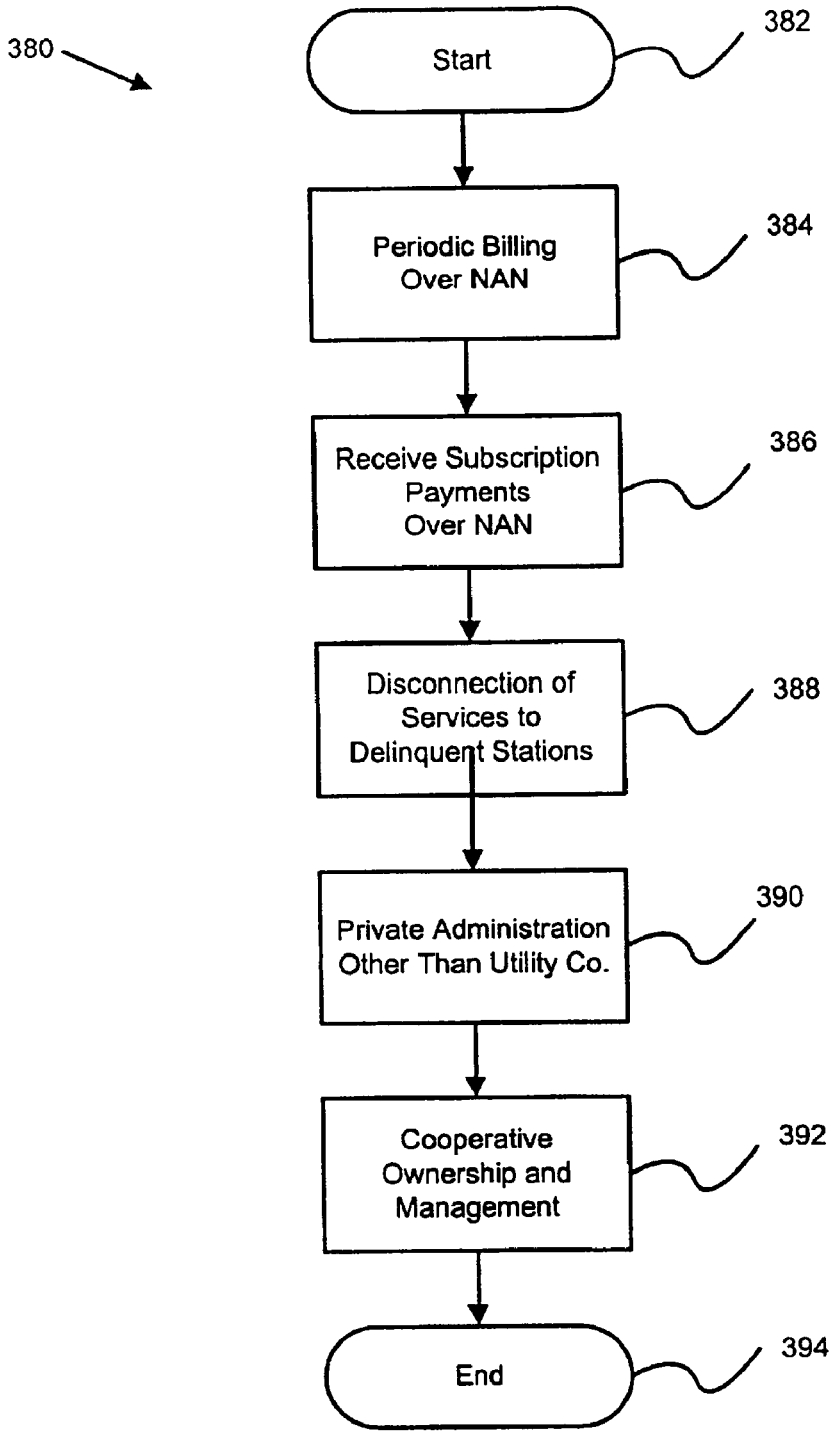

Administering a NAN of step 264 of FIG. 9 may be conducted in accordance with a method 380 of FIG. 15. The method 380 begins at a start step 382 and progresses to a step 384. At step 384, periodic billing statements may be transmitted over the NAN 10. The billing is preferably coordinated and monitored by the central HQ 20.

At a step 386, payments may also be transmitted over the NAN by credit card, digital signature types of E-commerce, and the like. When a communicating station 30 fails to pay its bills, reminders may be automatically sent over the NAN, and if the problem persists, suspension of NAN privileges may be levied until the fees are paid as indicated by a step 388.

As indicated by a step 390, administration may be conducted by government entities such as municipalities, but more preferably, the administrative entity comprises a private organization. The organization may be the provider of the NAN. Preferably, where a utility service provider is involved in financing and installing the NAN 10, the administrative entity is other than the utility service provider. In one embodiment, as represented by a step 392, the ownership and management of the NAN 10 is a cooperative venture of the users located at the various communicating stations 30. The method 380 preferably ends at a step 394.

The NAN of the present invention provides certain advantages including providing high speed (high band width) Internet access at a low price compared to conventional technologies. Advantages of the NAN also include the capability of real-time video conferencing. The NAN allows a region such as a geographical region of otherwise unrelated entities, such as a town or neighborhood, to be networked in high speed computer communication.

The NAN may be financed at least partially by utilities in order to expedite installation and may rely on the rights of way of public utilities such as power companies. The "last mile" dilemma is also solved under the present invention, as the system allows for inexpensive installation of facilities for the "last mile" of a network infrastructure and relatively faster operation thereof Thus, an advantage of the NAN is that it provides cost effective last mile service and delivery.

The NAN also operates at very high speeds. Preferably, message traffic is directly hauled to its destination, rather than passing the message traffic through a central server or router. Indeed, under one embodiment, the NAN efficiencies are achieved without a central server altogether.

Additionally, the NAN provides support for a broader variety of devices and types of devices to be networked. The NAN system of the present invention does not rely on the telephone line infrastructure, and consequently eliminates handling errors that occur with user log ons. Additionally, the telephone lines and other telecommunications infrastructure receive less traffic and are less likely to be jammed with message traffic when the NAN is employed to relieve them of being overburdened. Indeed, the NAN in one embodiment achieves total independence from the telecommunication infrastructure.

Also, no modem hardware or protocol is necessary at the user facility. Conventional T-1 lines, fiber converters, and cable modems are unnecessary in achieving the much higher speeds of the NAN of the present invention. Additionally, Internet access may be provided over the NAN and Internet connection may operate at comparatively high speeds. For instance, Internet access may in one example be as high as ten Mbps while employing certain currently available hardware.

The NAN allows free competition among Internet service providers and allows them to freely hook into the NAN system. The Internet connectivity is always on and continuous at any given communicating station without the need of a dial-up. Due to the elimination of modems in connecting to the Internet, low data losses are experienced. For instance, hand shaking errors between modems and error data that otherwise arises between modems may be reduced or eliminated. This is largely due to the absence of protocol conversions with the inventive system.

The operational hardware and software of the NAN include hubs, packets, bridges, and gateways disposed at different points to allow directly routed, packeted traffic. The system distributes traffic to the lowest segment. Direct routing may be peer-to-peer rather than being controlled by a switchboard, server, or central office. The results of this arrangement is very high speed packet transfer.

The system may rely on MAC addresses and static, masqueraded, IP addressing rather than dynamic IP addressing. The system may provide a binding between a hardware device and a user so the system stores the user's public IP addresses.

Additionally, communications within the network are secure and the network is user friendly. The high-speed networking supports real-time communications with cameras. Indeed, because of the low cost, users can connect to more devices, one example of which is utility meters. The system makes remote meter reading and monitoring of other types of utility services cost effective.

The NAN of the present invention is also unique in that no network administration is necessary to control local message traffic. Traffic may be independent of any governing authority. Additionally, because the Internet is both a large scale system and localized within a geographic area, business services such as advertising can be offered locally, making them more efficient. Thus, local advertising may be directed to a local audience. The system may support interconnection with virtually any devices within a community. The system may utilize permanent IP addresses due to a unique Dynamic Host Configuration Protocol (DHCP).

The neighborhood area network (NAN) may operate upon an IPX/SPX and Ethernet protocol. Broadcasts packets from the clients are preferably blocked at every bridge as well as DHCP traffic.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for linking communication stations within a geographical region in computer communication, comprising:

a high speed backbone;

a plurality of branching nodes connected to the high speed backbone for relaying digital communications at baseband;

a plurality of communicating stations communicating over the backbone through the branching nodes, the [branching nodes] *communicating stations* each housed in different buildings; and a home connection box having connectors for connecting a communicating station with a hub associated with its branching node, the connectors including a network communications connector and a power connector for supplying power from the communicating station to the hub;

wherein the branching nodes each comprise:

a hub directly connected with others of the branching nodes and directly interconnecting the plurality of communicating stations in digital communication; and a power concentrator, the power concentrator receiving power from a plurality of communicating stations in communication with the branching node and powering the branching node with the received power, the received power being redundant, in that at least one of the communicating stations can go off-line without stopping power to the branching node.

2. The apparatus of claim 1, wherein the hub is largely housed out of doors within environmentally controlled housings.

3. The apparatus of claim 1, wherein the hub is powered by power sources emanating from a plurality of the buildings.

4. The apparatus of claim 1, wherein one or more of the communicating stations [comprises] *are comprised within* a [residence] *building*.

5. The apparatus of claim 1, further comprising a protective pedestal housing at least a portion of the nodes.

6. An apparatus for linking communicating stations within a geographical region in computer communication, comprising:

a high speed backbone;

a plurality of communicating stations communicating over the backbone through branching nodes for relaying digital communications at baseband, the branching nodes each housed in different buildings, at least one of the communicating stations comprising a residence;

a hub communicating with the high speed backbone and directly connected with the plurality of branching nodes and directly interconnecting the plurality of communicating stations [in digital communication at baseband], the hub largely housed out of doors within environmentally controlled housings and powered by power from a plurality of power sources each located within [a] *one of the* different [one of the plurality of the] buildings;

a protective pedestal housing the hub, the protective pedestal located out of doors;

a power concentrator located within [one or more] *a first* of the branching nodes, the power concentrator receiving power from [a] *two or more of the* plurality of the communicating stations *that are* in communication with the *first* branching node and powering the *first* branching node with the received power, the received power being redundant, in that one or more of the communicating stations can go off-line without stopping power to the *first* branching node; and a home connection box having connectors adapted to connect a communicating station with the hub, the connectors including a network communications connector and a power connector for supplying power from the communicating station to the hub.

7. The apparatus of claim 1, further comprising means for transmitting data [from a] security and alarm system *information* from a plurality of the individual communicating stations to a central security office over the plurality of branching nodes.

*8. A system for linking communication stations within a geographical region in computer communication, the system comprising:*

*branching nodes, wherein each of the branching nodes comprises a hub and a power concentrator, wherein the hub of each branching node is connected to a backbone that is configured to relay digital communications at baseband, wherein the hub of each branching node is connected to one or more hubs of one or more other ones of the branching nodes through the backbone;*

*communication stations connected to the branching nodes and configured to communicate over the backbone through the hubs of the branching nodes;*

*a first home connection box having connectors configured to connect to a first of the communication stations to a first of the branching nodes, wherein the connectors include a network communications connector and a power connector, wherein the power connector is configured to supply power from the first communication station to the power concentrator of the first branching node;*

*wherein the power concentrator of each branching node is configured to receive power from a plurality of the communication stations and to redundantly power that branching node with the received power.*

*9. The system of claim 8, wherein each of the communication stations is configured to connect to exactly one of the branching nodes.*

*10. The system of claim 8, wherein the first communication station comprises a computer and a power outlet, wherein the network communications connector is configured for coupling to the computer and enabling transfer of at least a portion of said digital communications to and from the computer, wherein the power connector is configured for coupling to said power outlet.*

*11. The system of claim 8, wherein a first of the branching nodes is housed in an outdoor housing.*

*12. The system of claim 11, wherein the outdoor housing is an earth-based pedestal housing or a hanging pedestal housing.*

*13. The system of claim 11, wherein the outdoor housing is environmentally controlled.*

*14. The system of claim 8, wherein each of the branching nodes is housed in a different building.*

*15. The system of claim 8, wherein at least one of the communication stations comprises a residence, wherein the power concentrator of each branching node is configured so that at least one of the corresponding plurality of communication stations can go off-line without stopping power to that branching node.*

*16. The system of claim 8, wherein the backbone comprises a ring of switches, wherein successive switches of the ring are coupled with optical fiber.*

*17. The system of claim 8, wherein the backbone comprises a local portion, wherein the local portion comprises one or more bridges coupled in a series.*

*18. The system of claim 17, wherein successive bridges of said series are coupled by one or more coaxial cables.*

*19. The system of claim 17, wherein each of the one or more bridges is configured to filter said digital communications so as to eliminate broadcast packets from said digital communications.*

*20. The system of claim 17, wherein the hub of each of the branching nodes is configured to connect to exactly one of the one or more bridges.*

*21. The system of claim 8, wherein each of the communication stations is configured to connect to one of the branching nodes through one or more twisted wire pairs.*

*22. The system of claim 8, wherein the hubs communicate only on the lower two levels of an OSI model.*

* * * * *

UNITED STATES PATENT AND TRADEMARK OFFICE

CERTIFICATE OF CORRECTION

PATENT NO. : RE43,163 E
APPLICATION NO. : 11/318396
DATED : February 7, 2012
INVENTOR(S) : Andrews et al.

It is certified that error appears in the above-identified patent and that said Letters Patent is hereby corrected as shown below:

On the Title page, item (75), under "Inventors", Line 8, delete "Larry G. Erdman," and insert -- Larry G. Erdmann, --.

On Title Page 3, item (56), under "Other Publications", Line 13, delete "Matthew N. 0." and insert -- Matthew N. O. --.

Column 1, line 12, delete "application is a Continuation-In-Part of and claims" and insert -- application claims --.

Column 25, line 17, in Claim 6, delete "adapted" and insert -- [adapted] *configured* --.

Column 25, line 41, in Claim 8, delete "*to connect to a first*" and insert -- *to connect a first* --.

Column 25, lines 45-47, in Claim 8, delete "*from the first communication station to the power concentrator of the first branching node;*" and insert -- *from the first of the communication stations to the power concentrator of the first of the branching nodes;* --.

Signed and Sealed this
Sixteenth Day of October, 2012

David J. Kappos

David J. Kappos
*Director of the United States Patent and Trademark Office*